(12) United States Patent
Tang

(10) Patent No.: US 9,965,649 B2
(45) Date of Patent: May 8, 2018

(54) SYSTEM AND METHOD FOR PROTECTING INTERNET USER DATA PRIVACY

(71) Applicant: Rujing Tang, Plano, TX (US)

(72) Inventor: Rujing Tang, Plano, TX (US)

( * ) Notice: Subject to any disclaimer, the term of this patent is extended or adjusted under 35 U.S.C. 154(b) by 174 days.

(21) Appl. No.: 15/157,849

(22) Filed: May 18, 2016

(65) Prior Publication Data

US 2017/0337397 A1  Nov. 23, 2017

Related U.S. Application Data

(60) Provisional application No. 62/163,423, filed on May 19, 2015.

(51) Int. Cl.
| | | |
|---|---|---|
| *G06F 17/00* | (2006.01) | |
| *G06F 21/62* | (2013.01) | |
| *H04L 29/08* | (2006.01) | |
| *G06F 17/30* | (2006.01) | |
| *H04L 29/06* | (2006.01) | |

(52) U.S. Cl.
CPC ...... *G06F 21/6254* (2013.01); *G06F 17/3087* (2013.01); *H04L 63/20* (2013.01); *H04L 67/02* (2013.01)

(58) Field of Classification Search
None
See application file for complete search history.

(56) References Cited

U.S. PATENT DOCUMENTS

| | | | | |
|---|---|---|---|---|
| 8,549,643 | B1 * | 10/2013 | Shou | G06F 21/556 455/410 |
| 8,559,927 | B2 * | 10/2013 | Kim | H04W 8/16 455/410 |
| 9,195,744 | B2 * | 11/2015 | Adachi | G06F 17/30864 |
| 9,721,023 | B2 * | 8/2017 | Clark | G06F 17/30867 |
| 2006/0242574 | A1 * | 10/2006 | Richardson | G06F 17/30899 715/210 |
| 2008/0056136 | A1 * | 3/2008 | Carbunar | H04L 45/00 370/238 |
| 2011/0119253 | A1 * | 5/2011 | Grabarnik | G06F 17/30864 707/722 |
| 2014/0258272 | A1 * | 9/2014 | Ai | G06F 17/30867 707/722 |
| 2016/0283731 | A1 * | 9/2016 | Chow | G06F 21/6218 |
| 2016/0371496 | A1 * | 12/2016 | Sell | G06F 9/45558 |

* cited by examiner

*Primary Examiner* — Kenny S Lin
(74) *Attorney, Agent, or Firm* — Jie Tan; JT Law Office

(57) ABSTRACT

In a query-response model system of network communication, to protect user data privacy, a plurality of Camouflage Queries are automatically generated to be sent along with Intended Queries. The mix of intended queries and the Camouflage Queries masks and obscures the intended queries. Camouflage Messages or queries create a noisy background and thus lower the signal to noise ratio (SNR) for a server or interceptor to detect the intended queries.

19 Claims, 15 Drawing Sheets

SYSTEM AND METHOD FOR PROTECTING INTERNET USER DATA PRIVACY

CROSS-REFERENCE

Priority is claimed from the U.S. Provisional Patent Application No. 62/163,423 entitled "System and Methods for Protecting Privacy Through Sending Camouflaging Information", filed on May 19, 2015, entirety of which is hereby incorporated by reference.

DESCRIPTION OF RELATED ART

The present application relates to a computer system and device for protecting user data privacy, and more particularly to a computer device system that automatically generates camouflaging information for protecting computer user data privacy.

Note that the points discussed below may reflect the hindsight gained from the disclosed inventions, and are not necessarily admitted to be prior art.

Privacy protection is an important topic in today's digital age. A user's communication with a remote server over an Internet connection is often collected, analyzed, stored by an online service provider. The communication may be used in the future in an unforeseeable way and may be against the best interest of the user. On the other hand, online service providers are under great burden and risks in complying with the Privacy Law requirement in keeping user data private. The legal boundary of the Privacy Law may not be exactly clear under certain circumstances.

Currently the main method for protecting a user's privacy is by using a proxy server. A proxy server can act as a relay between the user and the intended Internet server, thereby partially obscures the user's identity and the communication content. Information from the user is first sent to the proxy and the proxy relays it to the intended web server. The response from the intended server is passed to the proxy and then forwarded to the user. However the information in the queries and responses between the user and the proxy server are still exposed to interceptors.

Another way to protect user's privacy is through encryption. However encryption still allows the server to know the history, content and pattern of the user's information sent to the server. The knowledge obtained by the server can be used against the user's interest. In an unforeseeable circumstance, the information could be obtained by a third party to use against the user. For example, a user's clickstream, web accesses, search requests, and interactions with a server are exposed to his ISP as well as the websites he visits to various degrees.

Imagine that a person named John Doe walk into a shop, picks up a DVD, decides not to buy it and then walks back out again. It would then be quite disturbing if every shop, post office, or social club that John visits in the next week all presented the same DVD to him, suggesting that he should buy it. But this is exactly what happens on the Internet as of today. Websites track users' movements and on the Internet there is very little that the users can do about it. Some web browsers have a "Do Not Track" option, but there is no legal requirement for any web site to honor the request.

Messaging privacy faces similar privacy problems. Messaging services such as instant messaging, emails, voice over IP, voice communication, video conferencing, social network, online forums, and on line comments mostly involve at least one server, which stores at least temporarily the content of the messages, or sometime for many years. The user's privacy is at risk despite a few technical solutions such as encryption and peer-to-peer communication.

There is a great need for computer enabled system and methods for better user privacy protection.

SUMMARY

The present application discloses a novel approach, a camouflaging system and methods, for protecting Internet user data privacy, namely by introducing background noises.

Many privacy invasion methods are accomplished by collecting user browsing activities and web page metadata to analyze query patterns for their own purposes. By introducing sufficient noise to users' intended queries, the metadata collection methods will becomes less effective.

An important utility of modern communication and the Internet in particular, is to enable a user to send a request or query to a remote server in expect to get useful information back related to that request. There are many activities that can be categorized as this 'query-response' model. Typically, the query is sent by a Query Unit, which tends to be run on the client device or client software; the query is sent to a server side, or a Response Unit for a response; the response is then sent from the Response Unit back to the Query Unit.

For example, a word search through google.com; current geo coordinates sent out by a mobile device for location-based service, and a request to access a web page through HTTP URL link, all can be categorized as a 'query-response' model. When the user enters a string to search on www.google.com, the search words are sent over the Internet to a GOOGLE™ server. A search is conducted inside the server and the results are sent back to the user's device.

The user's query is exposed to many entities during this communication process, including the internet service provider, the web server, and a would-be eavesdropper that collects the query. In addition, many websites use a variety of techniques to gather information regarding what a user searches or what websites a user accesses, and the patterns established over multiple searches over a period of time. For instance, cookies are used to associate a particular browser on the computer with Internet activities originated from that browser. Many websites implant 'cookies', a text based file, on the user's computer to uniquely identify the computer and the browser. The user's history of browsing that website is tracked through this identifying mechanism. With that knowledge, the websites are able to send targeted advertisement or resell this information to a third party.

Geo location coordinates are used extensively in today's mobile world. A user's mobile device sends out the geo coordinates to a server, and the server sends back information or service back to the mobile device. The geo location is exposed in the multiple links along this query-response model. People who have access to the queries are able to identify the user and his travel history.

In an embodiment of the present invention, a Camouflaging Query (CQ) system is established to protect the user's privacy in the query-response Internet communication model. The CQ system at its minimum comprises a Camouflage Query generator, and it may further comprise a database, an application interface, a policy center, and a user interface. Individual functional components independently or in combination, achieve the desired functionalities. Camouflaging Query (CQ) system generates computer generated queries (CQ) to obscure the content and identity of a user generated query, or intended query (IQ). A CQ resembles an IQ generated or initiated by a user. The combination of such CQs and IQs would obfuscate a third party.

IQs and the CQs are both understood by the Response Unit or the server. Since the CQs are not what user's intended queries, they could be said as 'false' queries, and are introduced in sufficient number to obfuscate other third party software, device or observer.

In one aspect, a CQ generator uses the same communication protocol that is used for the user generated intended queries.

In one embodiment, the CQ generator generates Camouflage Queries by selecting a plurality of CQ records in the CQ database and by consulting the CQ policy center. In essence, the CQ generator is a software component that creates the content of a CQ. For instance, if the CQ is supposed to be a text string, then the CQ generator is a software component that creates that text string. The format of that CQ text string, such as the length, the language, and the number of words, mimics the IQ. For instance, if an IQ is a search string in English to be sent to a search engine such as google.com, then an appropriate example of a CQ is a randomly chosen word, or words, or a phrase from an English dictionary.

The CQs are then handled by the application interface, which is responsible for sending the CQs to an appropriate destination by connecting to a communication means, or by coupling with another software application. The user interface lets a user or a program start, stop or modify the attributes of CQ that is in turn stored in the CQ policy center. The CQ policy center is responsible for making the CQs' contents and transmission patterns emulating the user's Internet behavior. The CQ policy center's objective is to make both the content and the transmission pattern emulate or mimic those of the IQs, therefore a third party has difficulty telling the CQ from the IQ.

In an embodiment that is used in internet browsing activity, the database comprises records of texts having attributes for "content", "source/parent web page URL or IP address", "time stored in the database", "search engine", "query type", "sensitivity level", and "Internet usage frequency." The "content" is the text string of the query itself; "source/parent web page URL or IP address" indicates where the content comes from, if it is obtained from HTTP link, then the web URL path is stored in this column; "time stored in the database" indicates the time stamp when this record was created; "search engine" indicates whether or not aimed for search purpose and what type of search engine; "query type" indicates the category of the query, such as a URL, a web page form, or an interactive element embedded in a web page; "sensitivity level" indicates how sensitive the content is. The level of sensitivity is rated by an algorithm using a score for sensitive words. For instance, the search word "conspiracy" has a higher sensitivity compared to "concrete". "Internet usage frequency" indicates how frequently the content is queried in general by an average Internet user. These attributes help the algorithm determine the appropriate selection of the CQs, and the mix of CQs and IQ.

In one embodiment, the CQ system is capable of sending CQs to a number of a popular and well known web sites and services. For instance, when the user opens a search engine's web page, or when the search engine's URL link is part of the CQ and communication has been established, the CQ generator starts sending queries to the search engine's server. The CQ generator retrieves words randomly from the database and automatically, recombines these words randomly and forms search phrases, then these CQs are sent to a search engine using its search input box.

In one embodiment, a toolbar for plug-in in a web browser software is included in the CQ system. The toolbar is a graphic user interface (GUI) that is launched with a web browser. The toolbar has access to the browser's storage as well communication means. The GUI comprises buttons and dialogue boxes for the user to start, stop, and modify the attributes of CQ. For a user generated IQ, the CQ system may generate several CQs from the database, The CQs and the IQ are sent to the same server in the same mechanism by the browser. The only difference is that the IQ is collected from the user input while the CQs are generated by the CQ generator.

In another embodiment, the CQ system includes an independent web browser-like functionality, except that the system does not display web pages. A cookie files may be provided, CQ requests are sent and responses to CQ requests will be quietly ignored. The CQ system emulates a user's web browsing activities and the CQ generator implements the same communication protocols as a web browser. In the primary embodiment, the CQ generator uses the same http protocol as the underlying protocol as web browser software, and substantially the same communication stacks as a web browser in transmitting the CQs.

In one embodiment, ignoring of the response for a CQ is accomplished by assigning and controlling a specific set of communication ports. In a web browser, HTTP protocol sits on top of TCP/IP layer. The access of a web page consists of sending a request started with 'GET', and receiving a response from a web server starting with '200 OK', followed by the content of the web page. It should be noted that the HTTP protocol uses TCP/IP protocol, which involves opening a port number for TCP/IP level communication. A port number binds a process or thread who was assigned that port number with a process or thread running on a remote server from information exchange standpoint. Different browser uses ports differently. Some browsers open a new TCP/IP port for each tab it opens. The TCP/IP stack on a given computer is controlled by the operating system, and has finite number of available ports. In Windows system, there is a parameter controls the maximum port number that can be used. Typically, ephemeral (short-lived) ports are allocated between the values of 1024 and 5000 inclusive. Responses received at the ports assigned for the CQ request are ignored.

In some embodiments, the responses from the server contain the original content of the queries. The user's client side software is able to match the IQ content with the query content embedded within the response to select only the matching response for further processing, while disregarding the rest of the responses. One such example is search engines like Google.com. The response it returns contains the search string and could be used to identify the useful response on the client side.

In yet another embodiment, the queries may be assigned unique query IDs, and each response contains the query ID. The client side software is able to discern the useful response by matching the IQ's query ID with the query ID embedded in the responses.

In one embodiment, a user is able to choose the cookie file of a browser to be used, or not used at all. The reason may depend on the level of privacy. Use of cookie file allows for further camouflaging between a CQ and an IQ, therefore further enhances privacy. If the cookie file of a web browser is used, the CQ system may be restricted in only sending search request and URL links, but not other type of queries, to mitigate the interference with a web browser. The CQ system also allows a user to add or remove CQ entries and to restrict the system from accessing the web pages accessed by the user's browsing current session. In addition, the restriction prescribes the links or buttons that the generator should not 'click' or send related information in CQ. The restriction list comprises confirmation button, shopping cart, check boxes, confirmation and acknowledgement such as 'I agree' button, and so forth. These measures lower the risk of interference to the user's browsing activities.

A web page may contain not only hyperlink of URL but also other clickable interactive elements, such as scripts, file downloads, buttons, check boxes, confirmation, acknowledgement, dialogue boxes, menu, navigation bar, and requests for a service provided by the server. In the literature the term 'forms' is used to categorize button, input box, option, and menus. Another example of interactive element is the 'play' button of an embedded video in a web page. Yet another example is mouse movement tracking where the movement of a mouse is sent to a server and used to perform certain functions. All of the above web page elements are collected and stored in the database for the next round of CQ generation. These elements typically require a user's input such as a click, a text input, or a mouse movement. The CQ generation emulates these user-generated actions by placing appropriate content in the CQ for sending out to the server. For instance, when data that has been entered into HTML forms is submitted, the names and values in the form elements are encoded and sent to the server in an HTTP request message using GET or POST.

In one embodiment a plurality of words and phrases taken from a dictionary are stored in the database for CQ generation. For example, a search string may be generated for GOOGLE™ search engine by combining different words in random orders. The search string is formulated into a CQ and sent to www.google.com automatically.

In a web browser, a web page is accesses and displayed. A typical web page consists of multiple hyperlinks, which lead to other web pages. When a web page is returned as result of a request from the system, the CQ generator stores all the embedded hyperlink's URL and other interactive elements embedded in the web page into the database. Interactive elements on a web page comprise buttons, text input boxes, video/audio play buttons, navigation bars, mouse move tracking method and other types of methods enabling user interaction. A web page is constructed according to HTTP protocol. A hyper link to a website embedded in a web page is detected based on the protocol. Similarly the interactive information in a web page is identified, classified and stored. The next round of CQ therefore likely includes some of the hyperlinks and interactive inputs from earlier returned web pages. This is to simulate the user's clickstream of surfing web pages using a web browser. The returned web pages are not displayed. The present invention mimics a web browser to make the web servers think it is a legit web browser.

In one embodiment, the CQ system is integrated with client side software of a mobile app that runs on a smart mobile device. The client software sends out the genuine geo coordinates as well as camouflage ones, in a random order. When the query results return as a response from the server, the client software discerns if it is the result of the intended query (IQ), i.e., the genuine geo-coordinates. Only the response to the genuine location is passed on to client app software.

The privacy over the transmission link is also enhanced because the combination of the CQ and IQ makes it hard for the server to know the user's geo information. Only the client software has the knowledge of the genuine location of the device. The mobile device is still able to use the services provided by the server software since it is able to pick the response to the genuine geo-coordinates. Furthermore, it is likely the server side software and client side software are aware of the presence of the system and tolerate camouflage queries. There is a motivation for a mobile app developer to integrate the system in their software because the system is able to alleviate the concern of the users regarding location-tracking privacy.

The CQ generator's database stores a typical user's location pattern. For instance, a continuous route along a road at reasonable speed is one such pattern. The generated CQs will be in the same pattern. For example, the user may use a location based software for better dining experience. The user's device sends out the IQ, which is the present location of the mobile device, as well as a plurality of CQs, which are the geo-locations of places other than the present location. Both are sent to the server. The IQ and CQs may have distinguishable query IDs. The server responds by sending restaurant locations, food ratings, and reservations of all the locations indicated by the CQs and the IQ. Knowing which responses correspond to the CQs by virtue of the query ID or the original query embedded within the responses, the CQ system on the client software can filter out the responses for CQs and pass the response to IQ to the user's client software, such as only the restaurants that are in the vicinity of the genuine location of the mobile device. Thus geo information of the user is camouflaged by the CQs. Only the user and the users' computing device know the identity information of the intended queries. The remote server does not know for certain the identity of the genuine queries because of all the other Camouflage Queries. The transmission link between the user's computer the server is safer because of the inability of telling the IQ from CQ by a would-be interceptor.

Many privacy invasion methods are through collecting web page metadata to analyze query patterns for their own purposes. By introducing sufficient noise to the intended queries, the metadata collection effort might be less effective.

In one embodiment, the system comprises both the client side and the server side software. The server side software is fully aware that some of the queries it responds to could be CQs. However the server would fully cooperate by responding to all queries, without trying to tell the IQs from the CQs. This type of system would be welcome by the users because it enhances privacy.

In another embodiment, a health device gives user health consultation by sending collected user health data to a server. The client side device and software will collect and provide such data and transmit to server side software. The server side software analyzes the data and returns a consultation. The client side health device might collect a set of biometric data from the user including heart rates, blood oxygen level, walking distance, skin conductivities and age. At the same time, the client side software also formulates a number of CQs, i.e. data sets that contains computer generated biometric data. The genuine user health data along with the CQs are sent to the remote server for consultation. The returned results would include the original queries' unique ID number or the query content for the client side software to discern. The client side software, knowing the IQ's content or its unique ID, would choose only the response that corresponds to the IQ to display to the user.

In cases of messaging, one embodiment of the present invention sends the intended message (IM) along with multiple Camouflage Messages (CMs) to the server. IM is what the user generates and wants to be sent to the intended party. Camouflage Messages resemble an intended message in the format and content. The format of a "message" comprises text string, audio signals, video signals, or other information formats. For instance, if Alice sends an IM to Bob, with the content "I will see you at 2:00 PM today", then a camouflage message could be "The movie is awesome", or "Let's meet next week". The database is stored with phrases that appear to be normal human generated messages for CM formulation. The CM selection does not have to rely on the specific IM. The CM is able to use grammar rules to formulate a plausible message by combining selected words from the database with some degree of randomness. The algorithm chooses a number of CM entries and mixes them with the IM. The ratio between them is adjustable in the user interface component of the system.

In one embodiment, a CM identifier may be associated with the CQ system. If two users both install CQ system on their client devices, the CQ system will automatically recognize a CM generated from a CQ system and automatically disregard them, so a user's device will function as usual while the server will still have many false noisy CMs to camouflage an IM.

In another embodiment, an identifier or a key is sent from Alice to Bob through a different communication link that bypasses the server. This communication link could be a cellular network short message service (SMS), or a telephone line, or a different server, or some other communication means. The identifier points out the characteristics of the IM amongst the IM and CMs. For instance, the identifier could be the sequence number of the IM among the IM and CM hybrid, or a unique random code contained within each message, or a result of an encryption of the IM. The recipient Bob receives the IM, the CMs and this identifier at approximately the same time. The system that runs on Bob's device is able to pick the IM with the help of the identifier. If Bob wants to send back to Alice, the process is the same but the message directions are reversed. The result is that the server has little knowledge of what the intended messages are with the presence of large number of CMs. The messages stored by the server have little value to a third party. The identifier itself is meaningless by itself. Because the identifier is transmitted through different communication links, unless someone intercepts all of them, which is less likely, the identifier itself is of no use. Further the identifier can be of transient nature without being stored. Once the message exchange is over, the keys or identifiers are no longer used.

The key generation may employ any cryptographic techniques, as long as Bob has the same encryption or cryptographic method as Alice. In one embodiment, the key is created using message authentication code (MAC) techniques, such as using keyed-hash message authentication code, or HMAC. In cryptography, a message authentication code is a short piece of information used to authenticate a message and to provide integrity and authenticity assurances on the message. Integrity assurances detect accidental and intentional message changes, while authenticity assurances affirm the message's origin. A MAC algorithm, sometimes called a keyed (cryptographic) hash function (however, cryptographic hash function is only one of the possible ways to generate MACs), accepts as input a secret key and an arbitrary-length message to be authenticated, and outputs a MAC (also known as a tag). The MAC value protects both a message's data integrity as well as its authenticity, by allowing verifiers (who also possess the secret key) to detect any changes to the message content. A MAC algorithm takes a secret key to produce the MAC.

In one embodiment of the present invention, the secret key used by the HMAC is generated by a secret key generator, which comprises a cryptographic hash function, such as one from SHA hash function family. The secret key generator encrypts the concatenation of a random number, also known as salt, and an initial value (IV). The IV is shared by Alice and Bob before the messaging takes place. The MAC and the salt are sent to Bob as the identifier of the intended message. When Bob receives the IM, CMs, the salt and the MAC, he can recover the intended message using the MAC and the salt as it is known in the technology field.

To combat known-plaintext attack, salt is randomly generated every time IM/CMs hybrid is sent. To combat brute force, the IV should be long enough, such as at least 128 bits. Further, Alice may potentially use a number of different IVs, and share different IVs with different recipients. By controlling which IV is used to obtain the MAC code, and who has the IV, Alice is able to control the access to the intended message. Alice can broadcast IM/CMs hybrid to a group of receiving parties, and only the receiving party with the correct IV is able to recover the IM. In some interesting scenarios, the IM is a word in a well-known dictionary containing N words, and the CM is the rest of the dictionary. Bob is able to recover the word after on average N/2 trials iterating all the possible words in the dictionary. Similarly IM could be a letter out of the alphabet, and Bob is able to recover the letter after even fewer steps. In both cases, there is even no need for sending the IM/CMs, only the salt and the MAC would suffice, which turns the scheme into an encryption method.

In another embodiment, CQ system is implemented on both the user side and the server side. The CQ component at the server side is capable of unmasking the IM/CMs transiently and presenting only the IM to the rest of the functionalities of the server side to respond.

The vast majority of messaging services rely on the server to provide access control. However, by using CM/IM hybrid in conjunction with a plurality of hash functions to implement MAC, the user is in control of who may gain access to the intended message. The servers are being entrusted with access control as well as the stored intended messages, which could result in risk of being hacked and the messages being compromised. Under the disclosed scheme, the IM/CM hybrid and a group of hash functions provide enhanced privacy and security because the IM/CMs stored in the server does not compromise IM directly even if all messages are revealed in plaintext, especially when the ratio of the number of CMs versus IM is sufficiently big. Furthermore, IM can be further decomposed into smaller unit, from a word all the way down to an individual letter.

One embodiment is in the social media network where a user posts CM/IM hybrid messages for a group of viewers, along with the MAC and salt pair. A viewer or recipient applies his or her own IV as input to recover the IM. Only the intended message hashed with the same secret key will yield a matching MAC. But without the correct IV, these messages are meaningless to other viewers. Thus the user is able to control the access to different intended messages to different viewers.

Camouflage information (CI) refers to either a camouflage message (CM) or a camouflage query (CQ). Intended information (II) refers to either an intended message (IM) or an intended query (IQ). A message differs from a query in that a message depends on obtaining previous messages to makes sense, whereas a query's interpretation is independent of earlier queries. For instance, a search conducted through a search engine does not require the search engine to remember last search, so this communication is of query type. In an instant messaging program, there are typically more than one round of sending and receiving of information in message type of communication, and there is a history and context dependency for a message to make sense to either party. Further in the context of this disclosure, messaging service comprises instant messaging, emails, voice over IP, voice communication, video conferencing, social network, online forums, on line comments, and other forms of human information exchange done remotely. The messaging services typically involve a server, which receives and stores user's messages for retrieval or forwarding to the listed recipient(s). The varieties of embodiments of the present invention provide enhanced privacy protection to these types of messaging activities mentioned above.

Further, camouflage information comprises a variety of formats. Information is rendered in text string, images, audio signals, video signals, electrical signals, electromagnetic signals, radio signals and other formats. Camouflage Information in this specification comprises formats listed above. The format of the Camouflage Information should be consistent with the Intended Information that is to be sent to the same destination. The various embodiments of the present invention seek to protect privacy of the information conveyed in different forms, formats, or renderings. In order to achieve camouflage effect, camouflage information is generated with substantially similar formats as the user generated intended information.

The exact contents of the camouflage information differ from that of user generated information, but appear to could have been generated by a user. Apart from the methods described regarding emulating a user's intended information, another method is to collect a user's intended information and decompose it into multiple parts and then recombine the parts in different orders with a certain degree of randomness. Based on this 'tear-apart-and-recombine' technique, some new elements similar to the original parts can be introduced and recombined to form CI. When the camouflage information is transmitted independently or along with intended information of a user, a server or would be interceptor would have difficulties telling them apart. Although in the preferred embodiments of the present invention, text string is the primary information format used in CI being sent to a search engine, a web site, or a server, other embodiments of the present invention use audio, video or other types of information formats as the content of the CI transmitted through a variety of communicating means.

A consideration is the communication and computing resources the camouflage information consumes. The communication resources comprise bandwidth needs in the transmission links. The computing resources comprise computing time, availability of the communication link and storage space. With the advent of modern infrastructure as well as improvement of computing devices in hardware and software, the concern of wasting communication or computing resources by introducing the camouflage information is mostly acceptable in exchange for enhanced privacy protection. Of course, the ratio between the amount of intended information and the amount of camouflage information should be weighed between the level of SNR and the cost of communication and computing resource. If the ratio is too high, Internet servers might detect anomaly. In some circumstance, for every one IQ, between 1 to 10,000 CQs might be transmitted, and the ratio does not have to be constant from time to time. This ratio could be understood as the signal to noise ratio (SNR) where the IQ is the signal and the CQ is noise. The ratio has to be designed such that the introduced noise does not block normal communications on the server side, while affording sufficient protection to the user generated data privacy.

Further privacy protection may be achieved by combining the present invention with other privacy protection techniques, such as proxy servers, data encryptions, VPN and other technologies. The present invention does not prevent layering these other techniques on top of it, and is transparent to other privacy protection technologies. Yet another way to gain further privacy protection is by cascading instances of an embodiment of the present invention. Each of the CIs and II (intended information) sent by a first computer is treated as II by a second computer, which generates its own CI. All the CIs and IIs are sent by the second computer to a server and the identity of the II is further obscured.

The CI when sent along with the II, mask the identity of the II. One of the design principles of CI is to make them indistinguishable from the II by a server or an interceptor. This way user privacy is protected at both the server side and in the communication links. Compared to the use of a proxy computer, the present invention offer stronger privacy features.

BRIEF DESCRIPTION OF THE DRAWINGS

The disclosed application will be described with reference to the accompanying drawings, which show important sample embodiments of the invention and which are incorporated in the specification hereof by reference, wherein.

DETAILED DESCRIPTION OF SAMPLE EMBODIMENTS

Figure 1A:
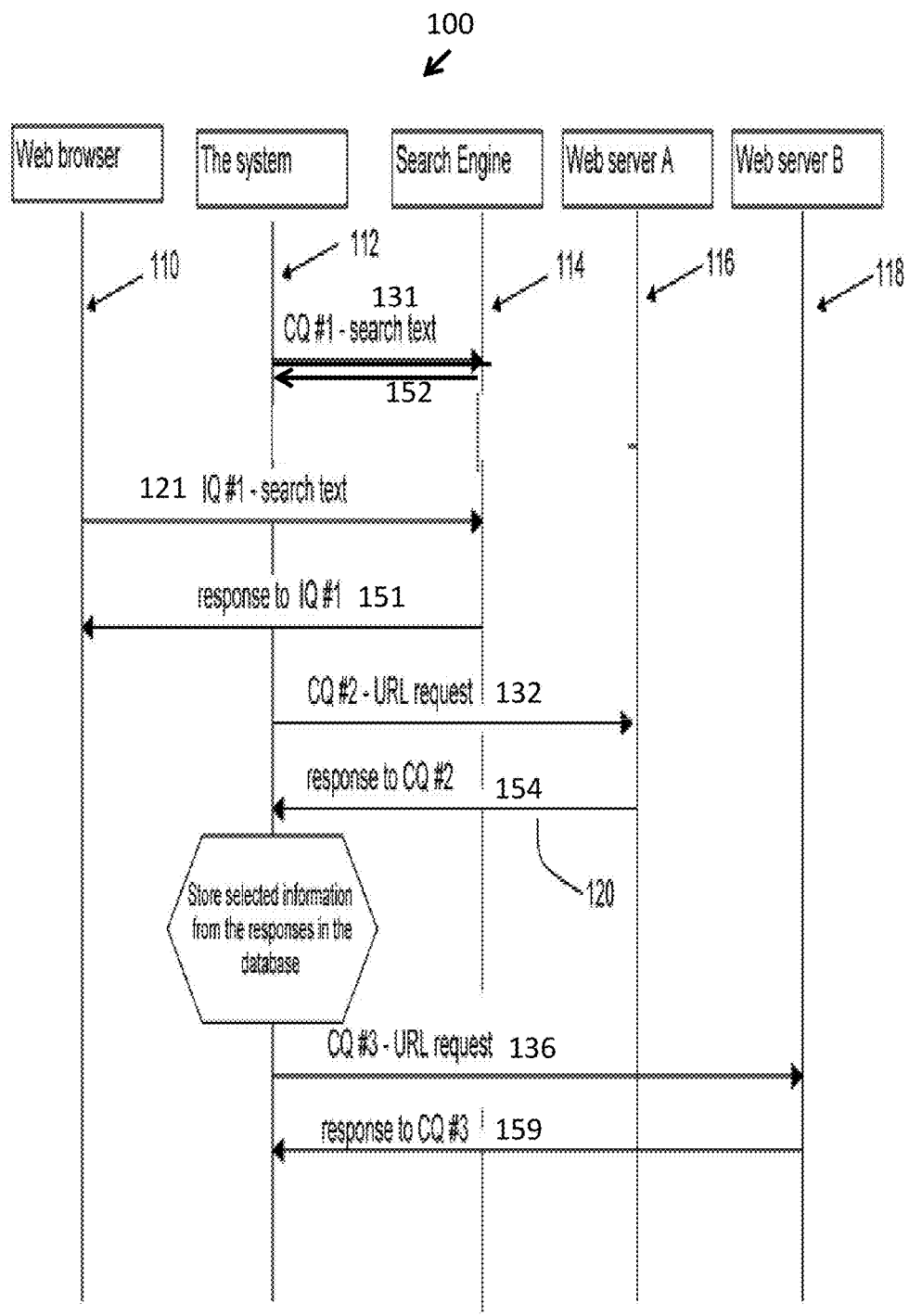
FIG. 1A schematically depicts an example Camouflaging Query sequence chart and transmission in accordance with this application.

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present invention, and that the detailed description is not to be taken in a limiting sense, and that elements may be differently positioned, or otherwise noted as in the appended claims without requirements of the written description being required thereto.

The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices.

Similarly, the software elements of the present invention may be implemented with any programming or scripting language such as C, C++, Java, COBOL, assembler, PERL, or the like, with the various algorithms being implemented with any combination of data structures, objects, processes, routines, or other programming elements. Further, it should be noted that the present invention may employ any number of conventional techniques for data transmission, signaling, data processing, network control, and the like. For a basic introduction to cryptography, please review a text written by Bruce Schneider which is entitled "Applied Cryptography: Protocols, Algorithms, And Source Code In C," published by John Wiley & Sons (second edition, 1996), which is hereby incorporated by reference.

It further will be appreciated that users may interact with like the system via any input device such as a keyboard, mouse, kiosk, personal digital assistant, handheld computer (e.g., Palm PILOT®), cellular phone, and/or the like. Similarly, the invention could be used in conjunction with any type of personal computer, network computer, workstation, minicomputer, mainframe, or the like, running any operating system, such as any version of Windows, Windows NT, Windows 2000, Windows 98, Windows 95, MacOS, OS/2, BeOS, Linux, UNIX, or the like. Moreover, although the invention may be described herein as being implemented with HTTP and TCP/IP communications protocols, it will be readily understood that the invention could also be implemented using IPX, Appletalk, IP-6, NetBIOS, OSI, or any number of existing or future protocols. Moreover, the system contemplates the use, sale, or distribution of any goods, services, or information over any network having similar functionality described herein.

Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

The term "Camouflage Information" or "CI" refers to information generated randomly and transmitted by software automatically for the objective of making identifying user generated intended information more difficult. Depending on the context, the term "Camouflage Information" means "Camouflage Query", or "Camouflage Message", or both.

The term "Intended Information" or "II" refers to information generated by a user to be sent to a server.

The term "Camouflage Query" or "CQ" refers to a request for information or service to a server wherein the request content is computer generated for the purpose of obscuring a user's Intended Query or Intended Information or Intended Message, and transmitted by software automatically.

The term "Intended Query" or "IQ" refers to a request for information or service to a server that is generated by a user.

The term "Camouflage Message" or "CM refers to a message generated randomly and transmitted by software automatically for the purpose of obscuring an intended message.

The term "Intended Message" or "IM" refers to a message generated by a user to communicate with other users.

The term "query" refers to a structured string for retrieving information from a database on a computer.

The term "response" refers to structured data retrieved from a database on a computer in response to a query.

The term "Query Unit" refers to the logic computer-component on a computer in a network that is capable of sending a request or query to another computer in the network through a communication protocol. A Query Unit is also used inter-exchangeably as a "client", a "client device", or "client software" depending on the context.

The term "Response Unit" refers to the logic computer-component on a computer in a network that is capable of sending a response upon receiving a request or query to the requesting computer in the network through a communication protocol. A Response Unit is also used inter-exchangeably as a "computer server" in some context.

The term "query-response" model refers to those computer network systems where a user sends a query through a Query Unit to obtain a response from a Response Unit.

The term "Server" refers to a computing device executing one or more software programs typically in a networked environment. However, a server may also be implemented as a virtual server (software programs) executed on one or more computing devices viewed as a server on the network.

The term "Communication Link" refers to a communications channel that connects two or more communicating devices. This link may be an actual physical link or it may be a logical link that uses one or more actual physical links. A communication link is generally one of several types of information transmission paths such as those provided by communication satellites, terrestrial radio communications infrastructure and computer networks to connect two or more points.

The "MAC algorithm" refers to a keyed (cryptographic) hash function that accepts as input a secret key and an arbitrary-length message to be authenticated, and outputs a message authentication code (MAC).

The "Salt" refers to random data that is used as an additional input to a one-way function that hashes a password.

The "Initial Value" or "IV" refers to data that is used as an input to a one-way hash function.

In reference to FIGS. 1A, 1B, 2A and 2B, FIG. 1A depicts a query process 100 between a built-in browser component 110, a CQ component 112 and various internet components, such as, search engine components 114, third party web server components 116 and 118.

In one embodiment, a user at web browser 110 sends an intended query 121 (IQ#1) to a search engine instance 114. In order to protect the user's searching privacy, CQ component 112 is activated and sends a number of computer generated camouflage queries 131 (CQ#1) to search engine instance 114. 131 (CQ#1) could be sent prior to 121 (IQ#1) or after it. Search engine instance 114 receives both IQ#1 and CQ#1 respectively, and sends respective response 151 to IQ #1 and response 152 to CQ#1 back to the user. Knowing response 152 is for CQ#1, a camouflaging query, CQ system 112 simply stores the response content in its internal database for future CQ generations, the stored content may include URLs links, buttons, navigation bar and other web interactive information elements embedded in that web page. The response content of the web page is not displayed while response 151 to IQ#1 is displayed on web browser component 110.

In addition, CQ component 112 can send computer generated queries 132 (CQ #2) and 136 (CQ #3) to two different web servers A (116) and B (118). The resulting response 154 to CQ #2 and response 159 to CQ#3 are not displayed. The embedded hyperlink of URLs, forms, and other interactive information elements contained in the responses can be stored in database 202 as content for CQ generation.

The computer generated CQs 131, 132 and 136 have different content information than the IQ 121 sent by the user while they share the same format, as well as other identifying information, such as IP address and computer network information, date and computer device login information. Because all the queries, including the user intended queries, are sent by the CQ system, the system can easily detect which responses are for CQs, and which response is for IQ either through the traditional way of query IDs or through specific tagging, or data port management.

Even though search engine 114 or web server 116 and 118 catch the information in IQs from the user, CQs 131, 132 and 136 thus create a lot of noise for search engine 114, web servers 116 and 118, which makes query analysis or metadata analysis difficult. The CQ component 112 is co-located with the web browser 110 on the client's computer device.

Figure 1B:
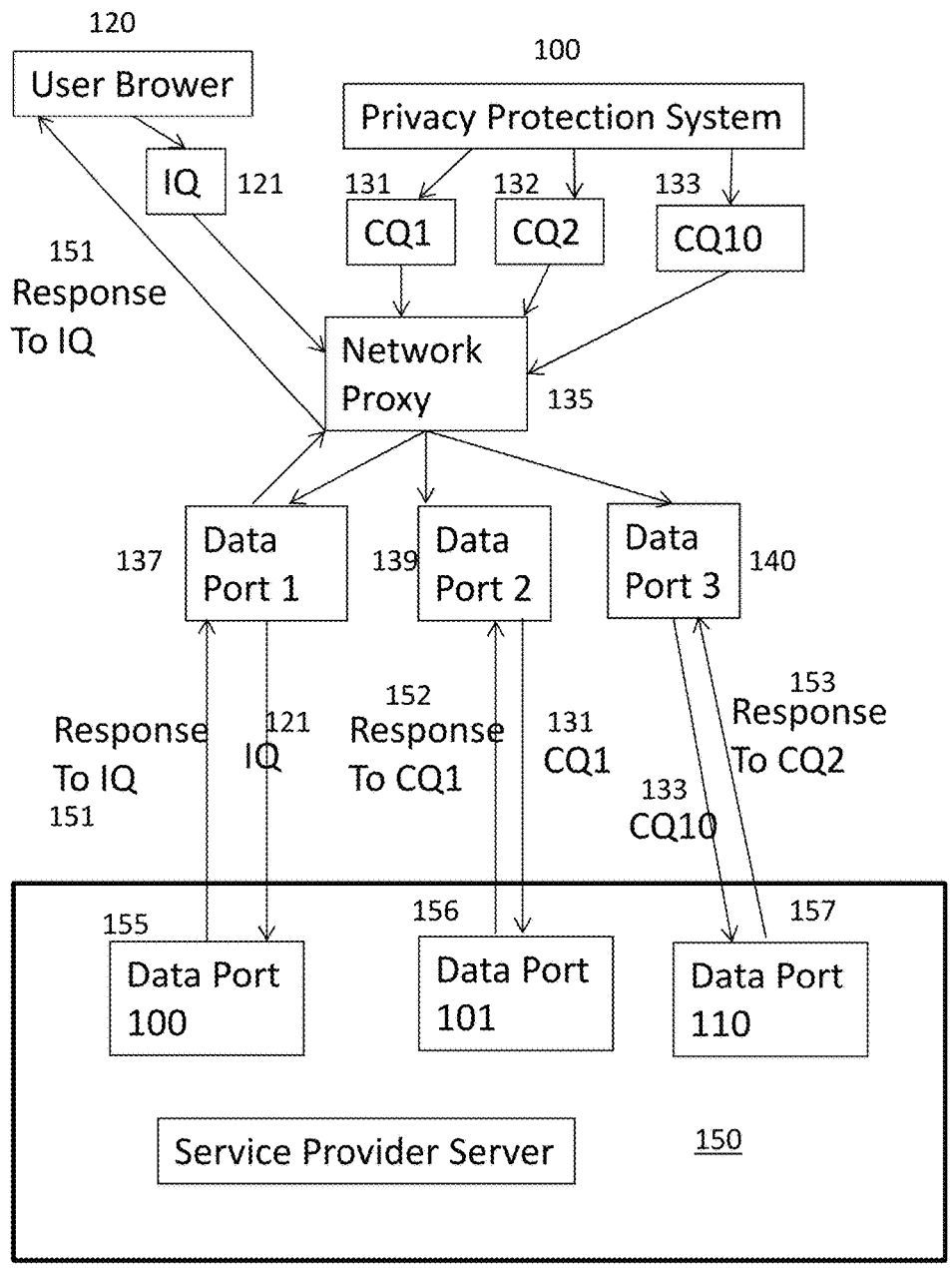
FIG. 1B schematically depicts an example user data flow chart in a Camouflaging Query system in accordance with this application.

FIG. 1B depicts one embodiment where a user uses a third party web browser 120 to send IQ 121. User Privacy Protection CQ system 100 would function independently as a browser plug-in. It also builds a network proxy component 135 for allocating data ports and directing the response data packets. When queries 121 are sent to a web service server 150 by a user, proxy 135 directs the data packets by user through data port 1 (137). But CQ system 100 detects query 121 and its header information in the data packet at the proxy 135, then sends a plurality of camouflage queries 131, 132, 133 to web service server 150 through a different set of data ports 139 and 140. Data packets 151 for responses to IQ 121 are also received through data port 1 (137) from server data port 100 (155) for user intended queries on the user computer. Data packets 152 and 153 for responses to CQs 131, 132 133 are sent and received through data port 2 (139) and data port 3 (140) to and from server data port 101 (156) and server data port 110 (157). The received data packets 152 and 152 at the allocated data ports 2 (139) and data port 3 (140) by CQ system 100 are then either stored in its database or disregarded.

The web service provider server 150 receives and responds to the queries IQ 121, as well as the CQs 131, 132 and 133, thus a lot of noise is being introduced for web server 150 for meaningful statistical analysis and for doing further data research on the user behavior patterns. It is very difficult for the server 150 to tell the IQs from the CQs apart.

Figure 2A:
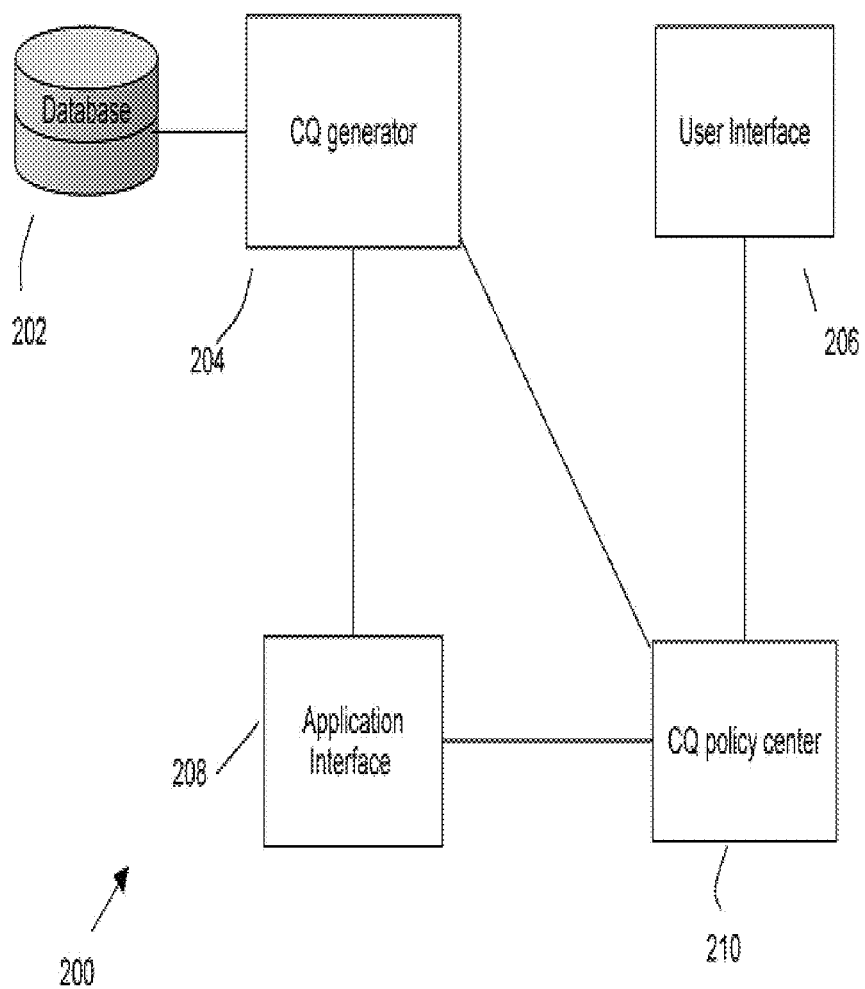
FIG. 2A schematically depicts the structural components of an example Camouflaging Query system in accordance with this application.

FIG. 2A depicts CQ system 200 that includes CQ generator 204, application interface 208, CQ policy center 210, user interface 206 and database 202 for storing the entries of CQ candidates that can be selected by the Camouflage Information Generator 204. Database 202 can store with different camouflage query candidates in different formats for different query purposes. For example, database 202 contains pre-stored content entries, such as a plurality of websites' URLs, dictionary words and phrases to form search strings. Database 202 can also contain website hyperlinks, forms and other interactive web information elements embedded in returned web pages that have been collected as 'in session content'. Database 202 can also contain geo location queries and geo location information.

When the camouflage information generator 204 selects CQ from the database 202, it selects with appropriate proportion for websites URLs, forms, and clickstreams as the content of the CQs for the current session by consulting the rules with the CQ policy center 210. The user interface 206 enables a user to start or stop the system, configure system parameters, change the attributes of the CQ, and visualize system status and statistics. The system parameters allow the user to adjust or customize the various aspects of the software. For instance, the user may wish to control the ratio between the numbers of IQ and CQs. The user adjustment is recorded in the CQ policy center 208. The application interface 208 is responsible for interfacing with other software applications running on the user's computer. One example of such application interface is the interface with a browser. Another example of the application interface is the interface with a communication facility when the embodiment is a standalone program. One of the responsibilities of the application interface 208 is for communication with a server. The CQs are sent to the application interface 208, which in turn consults the CQ policy center for appropriate transmission pattern. Subsequently, the CQs are sent out to the server.

CQ system 200 is co-located with the user's computer or computing device where the same computer IP address and MAC address are used so that the CQs can camouflage the IQs from third parties.

Figure 2B:
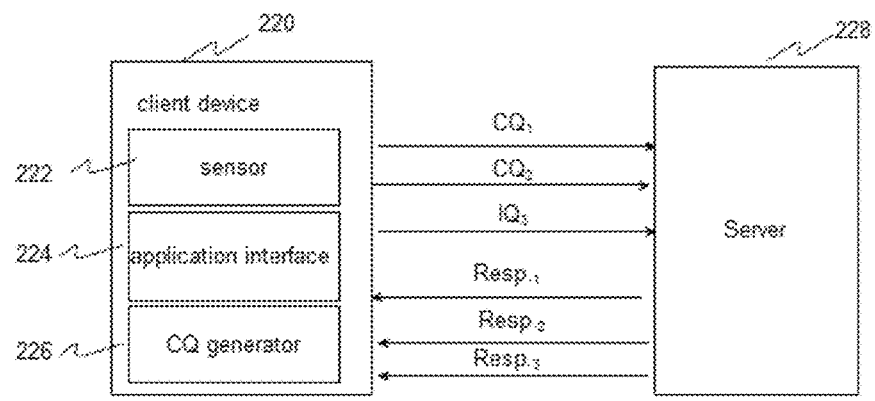
FIG. 2B schematically depicts the structural components of an example device using the Camouflaging Query system in accordance with this application.

FIG. 2B schematically depicts the structural components of an example device using the Camouflaging Query system in accordance with this application. The device 220 could be any device that needs to communicate externally, such as a mobile phone, a health device, a component of so called 'Internet of Things', a payment processing device, a vehicle, an aircraft, a wireless module, a wearable device, or a piece of software residing in computer memory.

Sensor 222 is responsible for collecting the genuine data set to be sent out as an intended query (IQ) in order to get a response from a server 228. The sensor 222 could be a GPS receiver, a biometric sensor, a keyboard, a touch screen, a camera, a pressure sensor, an wireless receiver, a detector for electronic signal, any sensor that detects the environment parameters or user input, or any other data collection software component. The application interface 224 is responsible for processing the responses from the external server 228. It is able to tell whether a response correspond to an IQ or a CQ. The CQ generator 226 generates CQs that mimic the content and the format of the IQ that is generated by the sensor 222. For instance, if the sensor 222 is a GPS device which generates geo-coordinates of the current device location, the CQ generator 226 would generate geo-coordinates in the same format but of different values from the genuine ones. The application interface 224 is able to discern which response is for the IQ. The values of the CQ could be random, or could be obtained via a database and algorithm to mimic a plausible geo-coordinate.

CQ1, CQ2 represent the CQs that are generated by the CQ generator 226, while the IQ3 represents the IQ that is generated by the sensor 222. All of them are being sent over a communication link to a server 228. The server 228 responds to each of the CQ1, CQ2, and IQ3 with Resp.1, Resp.2, and Resp.3, respectively. The server 228 is not able to tell which query is camouflage query and which is not.

The Responses are being parsed in the client device 220. Because the client device 220 has the full knowledge of the CQ and IQ, the device 220 is able to tell which response is the one that corresponds to the IQ. In this case it is Resp.3. In some embodiment, the client software is able to use relevance between the response and the IQ to tell which response is the desired response to the IQ. For instance, if the device is a health consultation device and the user of the device is a male, the client software may ignore the health consultation responses labeled for a female. The time when the response is received also implies which response corresponds to the IQ. For instance, in a typical network environment, the response to a query should be returned within a certain period of time, say less than 1 second. If the response received is within that anticipated response time after an IQ was sent, then that response would likely be the response to that IQ, provided there is no other queries were sent during that period. The client software has total control as when to send the CQs therefore the time element could be used to filter out the responses to a CQ. In yet other circumstances, the original queries are easily identified in the content of the responses. For instance, the query content might be embedded in the response; or the query was assigned a unique ID and that ID was embedded in the response. The device 220 could identify the responses associated with the intended queries by examining the content of the responses.

The application interface 224 only presents the Resp. 3 as the useful response and disregard the rest responses.

In one embodiment, the device 220 is a smart phone with GPS capabilities. The sensor 222 receives the GPS coordinates of the device location. The CQ generator generates many different GPS coordinates as CQs. All the geo-coordinates have the same format and are being sent to a location based service server 228 for nearby restaurant information. The restaurants information is returned as in Resp.1, Resp.2 and Resp.3 for the three geo-coordinates. Since the smart phone 220 knows the real geo-coordinates, and each responses have the geo-coordinates (or an identifier) embedded, the application interface is able to present only the response (i.e. Resp. 3) corresponding to the IQ.

Figure 3:
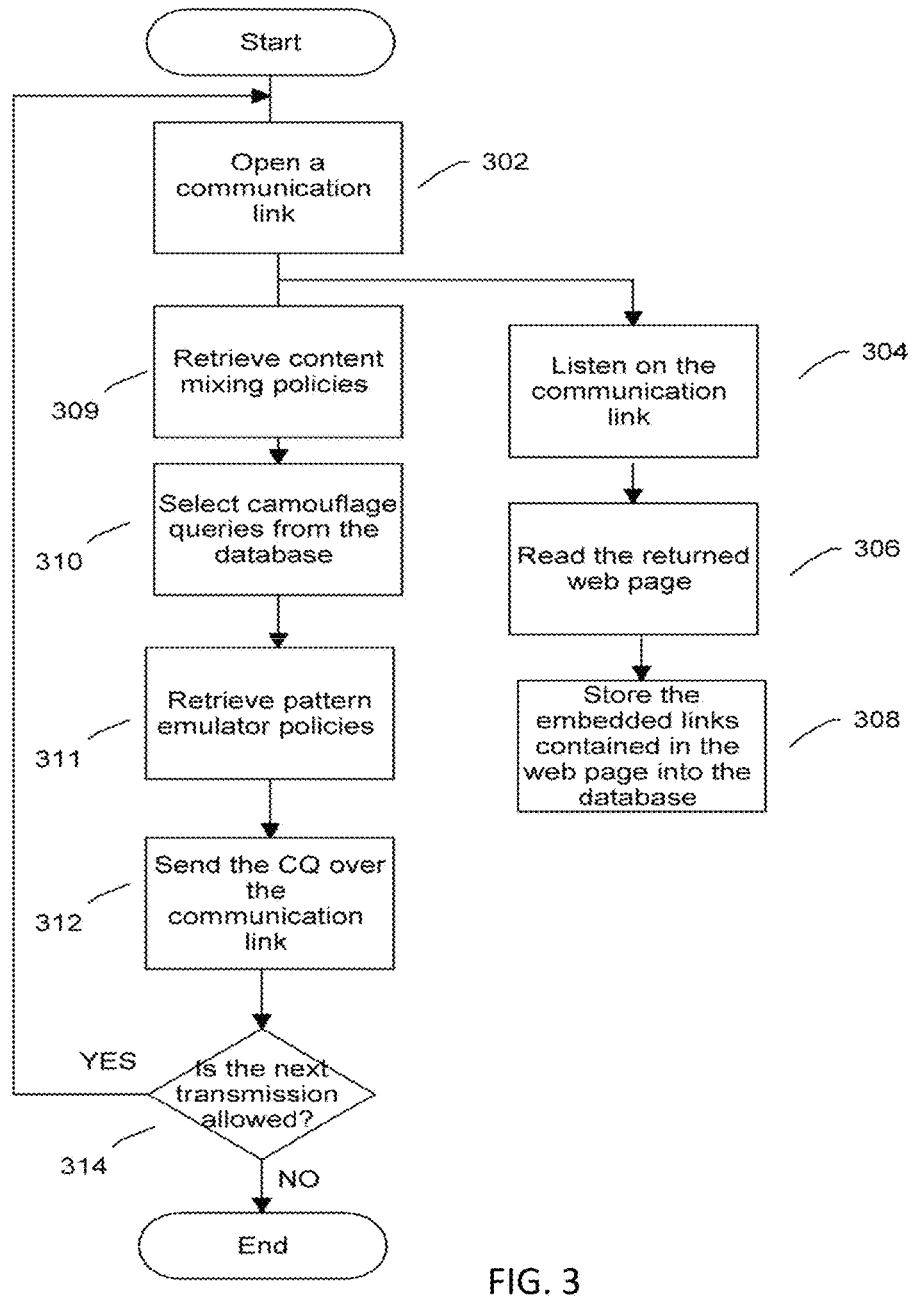
FIG. 3 schematically depicts the flowchart of generating and transmitting a camouflage query in an example Camouflaging Query system in accordance with this application.

FIG. 3 depicts the function component flowchart of a typical standalone CQ system that is based on http protocol. The CQ sessions run independently of a web browser. It mimics a typical user's web browser's activities without arousing suspicion of a web server or an interceptor. Step 302 opens a TCP/IP link to communicate with a remote server over the Internet. Content mixing policies are first retrieved from the Policy Center in step 309. In step 310, the CQ generator selects Camouflage Query from database 202 in FIG. 2A based on the content mixing policy. The database has pre-installation or static content entries as well as entries generated by the system during the session, or in session content. The pre-installed entries in the database may serve as an initial repository of CQ candidates of search words and URL links. The entries may be generated after the installation using URLs, forms, and other interactive web elements that are contained web pages accessed in the current session or "in session content." And alternatively the database can store download new entries from the Internet in order to keep abreast with the latest trends of Internet search and new popular websites. Database 202 from FIG. 2A may be automatically updated. In one embodiment, the download is from an Internet server dedicated to this purpose. In another embodiment, the downloading is done by a software search bot built within the system. The search bot automatically search a variety of websites to update itself with the latest search words and website URLs and then deposit them as static content in the database for later CQ formation. As a result, the database has a plurality of search words and phrase that are searched by a presumed typical Internet user. In addition, the database has a plurality of CQ candidates that are URL links of websites.

After the CQs have been formulated and mixed, the CQ generator 204 in FIG. 2A sends them to the application interface 208, also depicted in FIG. 2A. The application interface retrieves the pattern emulator policies in step 311 from the policy center 210 shown in FIG. 2A to determine the timing and pattern of sending the CQs. The application interface 208 then transmits them in step 312 through the communication link opened in step 302. Step 314 indicates a loop that runs until some event stops the loop. The condition could be a limit of the available TCP/IP ports number has been reached, or the number of CQs has reached a limit, or could be some other conditions.

Step 304 can run as a thread or a process at the same time as step 310. Step 304 listens on the communication link that has been opened in step 302. For every queries sent over to a web site, there is typically a web page coming back to the system as a response from the server. In the case of search engine, the returned web page contains multiple embedded links such as URL links related to the search string. In the case of a URL query, the returned web page is a web page. Step 306 collects the URL links, forms and other interactive elements from a returned web page. Step 308 stores them in the database 202's 'in session content'. The newly added entries may be used by the CQ generator for future CQs.

Some CQ selections include at least some URL links embedded as hyperlinks in previously retuned web pages. The percentage of this type of CQs is carefully calibrated so that they appear to be from a web browser or clickstream. The quantity of the Camouflage Queries over a period of time is carefully controlled so they do not overwhelm the remote server. The total number of queries sent over a period of time is called the query time density. The time density has an upper threshold to avoid triggering remote servers' warning system, or being treated as a malicious user.

Figure 4:
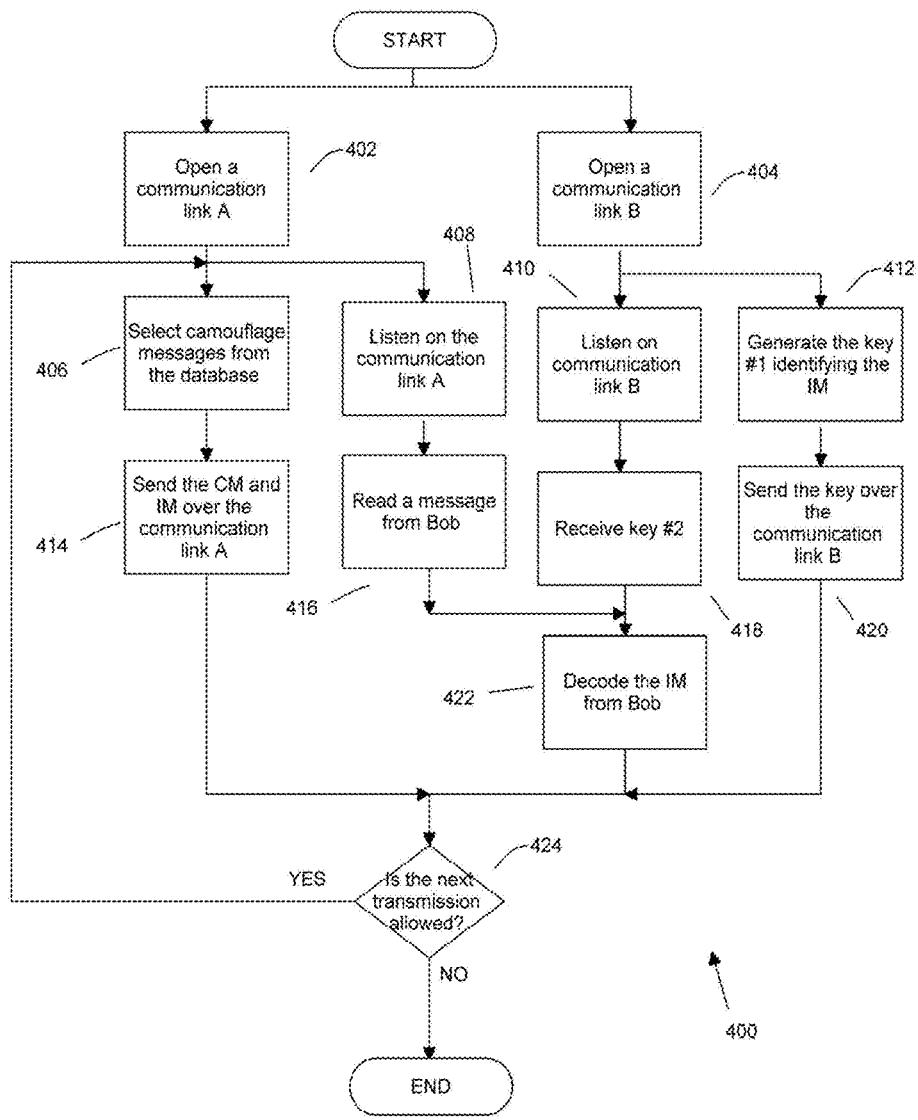
FIG. 4 schematically depicts the flowchart of message exchanges in an example Camouflaging Query system in accordance with this application.

FIG. 4 describes an example message exchange system for multiple users using the CQ system with Camouflage Message (CM) generation and a separate communication link. User Alice's CQ system 400 is shown.

Alice is communicating with user Bob through an Internet server. A communication link A is opened by the system in step 402. A different communication link B is opened in step 404. The difference between the two communication link A and B could be physical or logical. Link A is used to communicate with the server, whereas link B does not communicate with the server. For instance, communication link A may represent a TCP/IP connection with a unique port number between the system and the server, while communication link B may represent a different TCP/IP connection with a different port number, and does not direct data to the server. Another example is in smart phone, the communication link A is represented as the data service that enabled Internet connection provided by a wireless carrier. The communication link B may be the text message service that is provided by the same carrier. In another example the communication link A is a TCP/IP connection with a server, and communicating link B is another TCP/IP connection on a different port with a different server. In step 406, the camouflage message (CM) generator randomly selects a CM from the database. The selected CM is then mixed with the intended message (IM) together in a random order in step 414, the messages are sent to the server to transmit to Bob.

A thread or a process at step 408 that is running at the same time as the process or thread carrying out step 406 is listening on the communication link A for incoming messages. The incoming messages that come from Bob are read in step 416. The incoming messages sent by the CQ system on Bob's computer consist of his intended message mixed with the Camouflage Message generated by the system running on Bob's computer. A process or a thread that is running at step 410 listens on the communication link B for the key#2 sent by Bob, which is received in step 418.

Combining key #2 from step 418, the CQ system on Alice decodes the IM and CM hybrid messages at step 422.

There are a variety of ways to use the key to identify the IM from a hybrid messages consisting IM and CMs. One method is by embedding the key as a unique identifier in each of the IM and CM. The key is the identifier that matches the identifier of the IM. For example, a message is "I will meet you at 2:00 PM today." and a random code such as 4EE9od is prefixed to the message before transmission. Each message is prefixed with its own unique random code. The key in this case is the code that prefixes the IM. Once the key and the IM/CM hybrid messages are received, the CQ system of Alice is able to find the IM by searching for the identifier conveyed by the key.

The system can use a secret key generator that encrypts using the concatenation of a random number, also known as salt, and an initial value (IV). The IV is shared by Alice and Bob before the messaging takes place. The message received by Alice may be in MAC and salt form encrypted by an SHA_1 hash function: secret_key=SHA_1_hash (IV||Salt). The secret key may be used in HMAC algorithm to generate the MAC for the intended message from Bob:

$$HMAC(K,m)=H((H \oplus opad)|H((K \oplus ipad)|m))$$

Where H is a cryptographic hash function, K is the secret_key, m is the intended message, | or || denotes concatenation, ⊕ denotes exclusive or (XOR), opad is the outer padding (0x5c5c5c . . . 5c5c, one-block-long hexadecimal constant), and ipad is the inner padding (0x363636 . . . 3636, one-block-long hexadecimal constant).

The MAC and the salt are sent to Alice as the identifier of the intended message. When Alice receives the IM, CMs, the salt and the MAC, her CQ system recovers the intended message by concatenating the IV with the salt to feed into the same secret key generator, which produces the secret key for the MAC algorithm: secret_key=SHA_1_hash (IV||Salt). The secret key is used in the same HMAC as Alice's to test each of the received message, Message$_i$: MAC$_i$=HMAC (secret_key, Message$_i$). Only the message that contains the IM will yield the same MAC.

Bob runs the same cryptographic hash function on all received messages, and only the IM after being hashed would yield the same MAC code as the key received, thereby the IM is identified. Key #1 is sent in step 420 over the communication link B. Step 424 indicates that the program runs in a loop unless some conditions exist to stop the loop. For instance, the user is able to select the conditions that should cause the system to halt.

Figure 5:
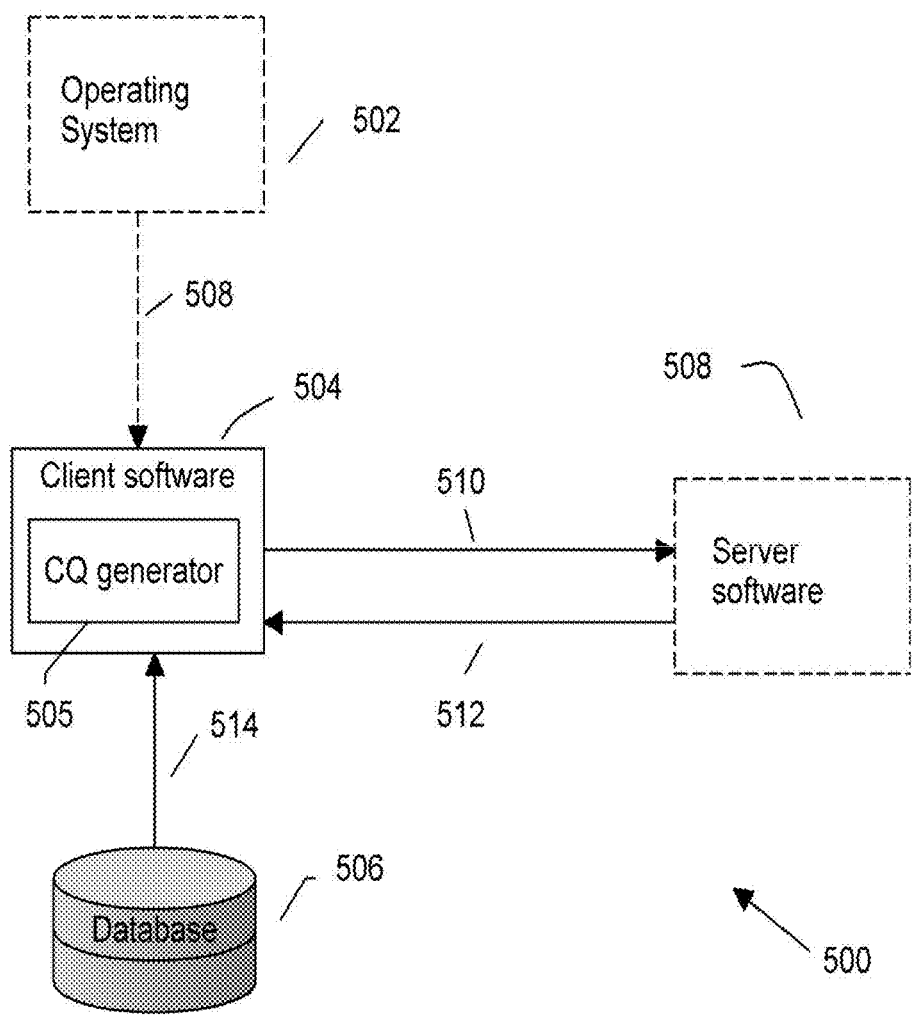
FIG. 5 schematically depicts the components of an example Camouflaging Query system used in geo-coordination web services.

FIG. 5 depicts the example CQ system architecture for being used geo-coordinates related web services through a mobile phone, such as when the phone automatically sends out geo-coordinate information to merchant web servers or GOOGLE™ search engine.

Mobile system 500 comprises client software 504 and a database 506. The client software 504 is a mobile app that runs on a user's mobile device. CQ generator 505 is integrated with the client software 504. A mobile device's operating system (OS) 502 provides geo coordinates as the result of an API call initiated by client software 504. IQ 508 is returned from OS 502 with geo-coordinates information that reflects the user's genuine location, or 'intended query' of the current mobile device. The client software 504 then retrieves camouflage geo-coordinates 514 from database 506. The geo-coordinates 514 are returned to the client software 504. The geo-coordinates CQ 514 are in genuine geo-coordinates forms, for example, mimicking a continuous route along an existing road, at an appropriate speed. Client software 504 then mixes IQ 508 and CQ 514 into mixed queries 510 which are sent server 509. Server 509 subsequently returns information related to both the IQ and CQ in messages 512. The client software utilizes only the information pertinent to the IQ and presents it to the user. The responses to the CQs are quietly ignored. This way, server 509 does not know the exact geo-location of the user.

Figure 6:
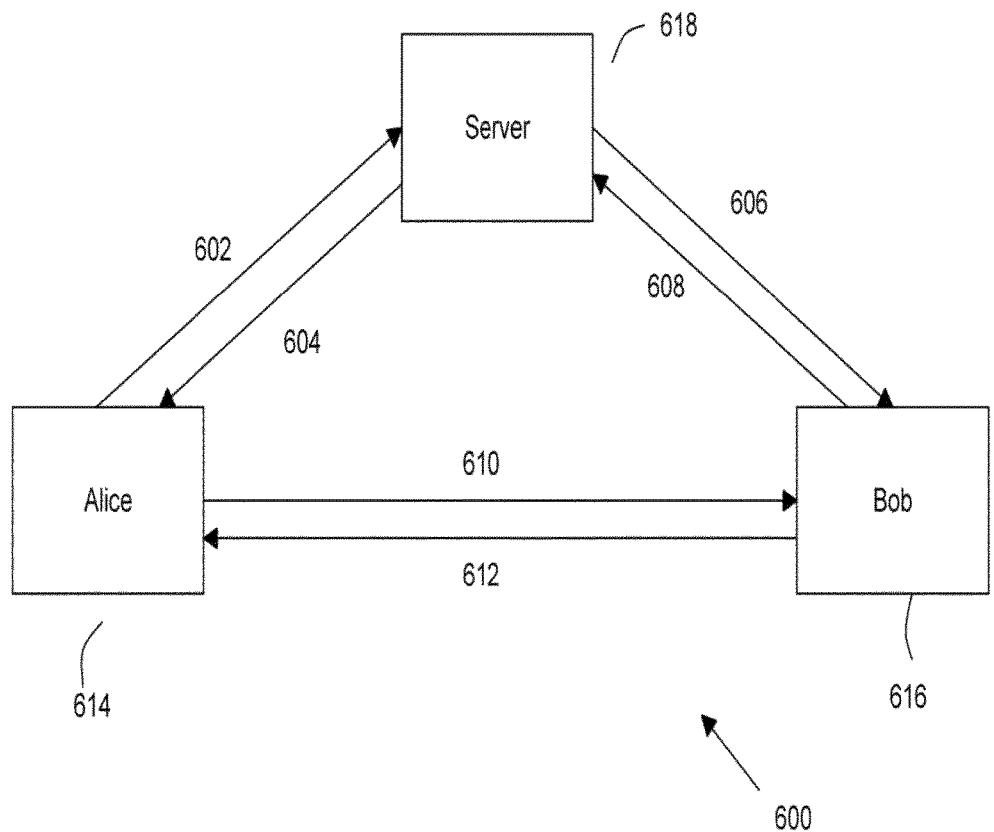
FIG. 6 schematically depicts an example message communication method that utilizes camouflage messages and a key sent through a separate channel.

FIG. 6 depicts Camouflage Messaging system for messaging services are social network, instant messaging, emails, online forums, voiceover IP, video conferencing and etc.

600 describes an overall configuration of the scheme. Server 618 is remotely connected to Alice 614 and Bob 616. Alice and Bob would like to achieve privacy in the communication links and on the sever side. They wish their messages couldn't be read meaningfully during or after the exchange of messages by anyone else. Alice sends the hybrid of Camouflage Message (CM) and the intended message (IM) in messages 602 to the server 618. In one embodiment of the present invention, the CM and IM can be plain text. It should be noted that the CM and IM might even be further encrypted to enhance privacy in other embodiments. The server 618 forwards the messages to Bob in message 606. At the same time, Alice sends a key 610 to Bob through a different communication link other than the channel used to send messages 602, and this communication link does not involve the server 618. The key is used by Bob to recover the IM from Alice. After Bob receives both the IM and CM messages and the key, he is able to decode and recover the IM. The key could be as simple as the sequence number of the IM in the IM/CMs hybrid, or could be more elaborate through hash functions. Another method for key generation and intended message identification is by adding a unique identifier in each of the intended message and the camouflage messages such as a number when the IM and CM are being transmitted from Alice's computer. The key would be the unique identifier of the intended message.

The server 618 has the knowledge of the CM and IM and may choose to store them. However, without a key the server is not able to tell IM and CM apart. The key is sent through a different communication channel and is not available to the server. The different communication channel has many options. For instance, typically the communication between Alice and the server is through the Internet. A different communication channel could be a telephone line, or a short message service (SMS) of a wireless carrier, or a different communication link with a different server on the Internet. The difference between the two communication channels could be physical or logical in nature. The more segregated the channels are, the less likely someone is able to possess both the IM/CM and the key. The privacy at the sever side is enhanced. The communication link used to send messages 602 is safe because the messages are a mixture IM and CM in random orders. An interceptor will find it hard to decode with low signal to noise ratio. Similarly, Bob is able to send IM/CM mixture 608 to the server 618, and server 618 forwards them to Alice in 604. Bob also sends a key 612 to Alice for decoding.

Figure 7:
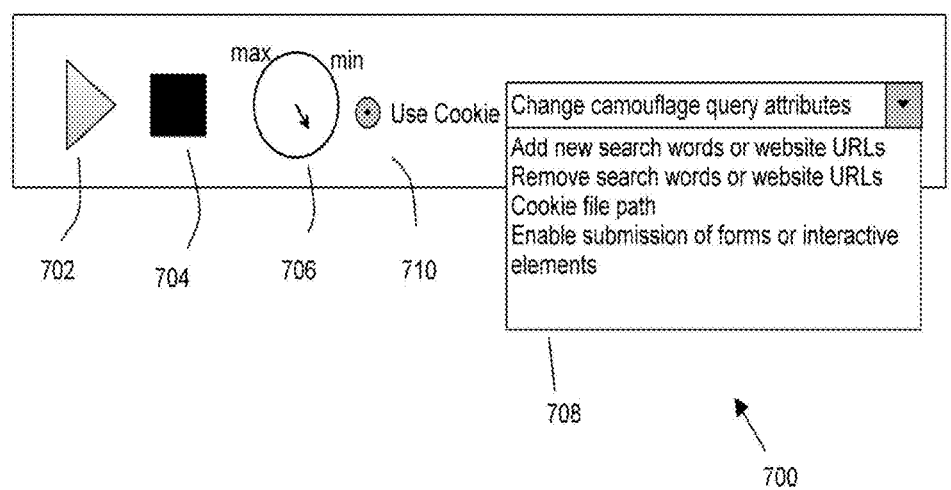
FIG. 7 figuratively depicts an example user interface Camouflaging Query system in accordance with this application.

An example graphic User Interface component for configuration is depicted in FIG. 7. 700 is the GUI that can be used as a toolbar of a web browser, or as a standalone program. Button 702 is for starting sending camouflage information, button 704 is to stop sending camouflage information; dial 706 lets a user to choose the number of camouflage information to be sent. The more number of camouflage queries the harder for others to identify the intended information but at a high expense of resources. The radio button 710 lets the user to choose whether a cookie file of a browser should be used. If a cookie file is used, the server will associate the click requests and behavior sent from the system with the unique ID stored in the cookie file. In other words, the server will remember and identify the sessions linked with that unique ID. The combo box 708 allows the user to adjust the camouflage information attributes. Once a selection is made in 708, another dialogue box will pop up for further user input. A user is able to add or remove the content for a group or a specific entry for a camouflage information. A user is able to link a cookie file created by a web browser with the system. Once a cookie file is linked, when the camouflage information is sent to a server who has implanted a cookie in the cookie file earlier, the camouflage information generator incorporates that cookie in the information being sent to that server. The server will think it is communicating with the web browser that it has established connection earlier. A user is also able to change in 708 the number of queries to be sent when the 'play' button 702 is pressed. The user is able to enable or disable forms and interactive elements submission in a web page, such as buttons, checkboxes, and mouse movement tracking.

Figure 8:
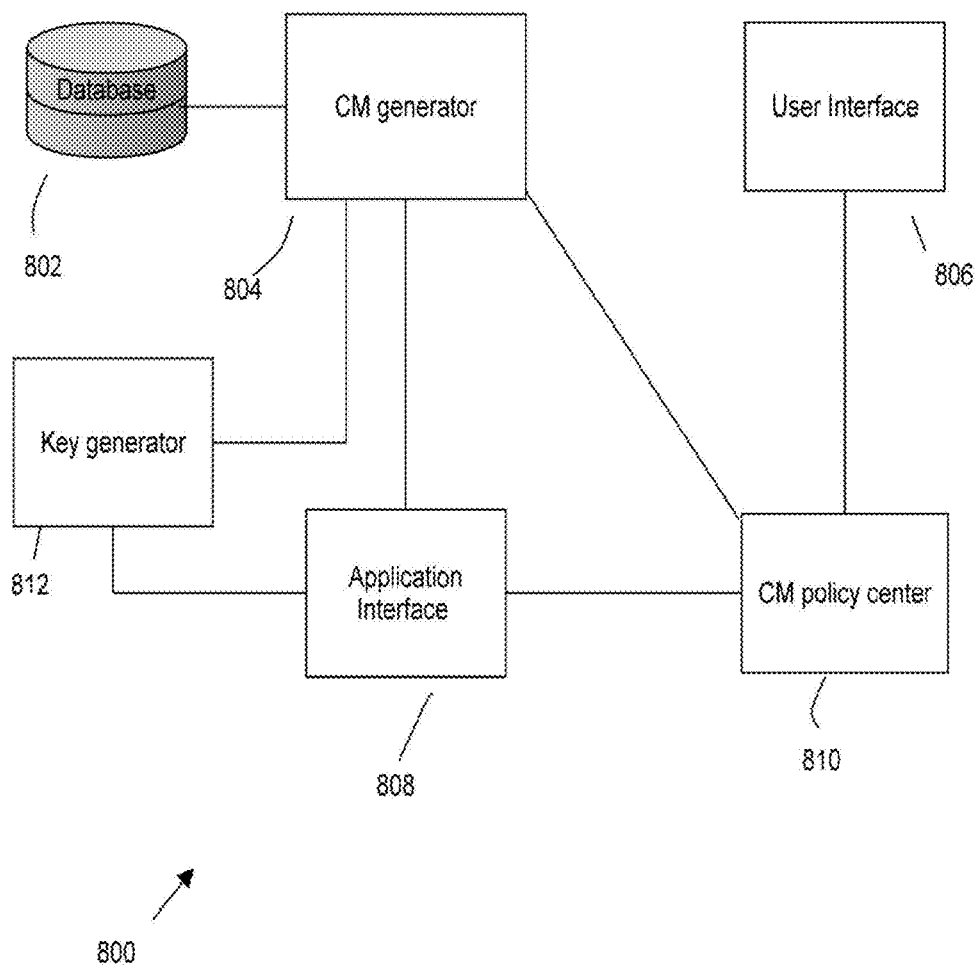
FIG. 8 schematically depicts the structural components in a messaging system using a Camouflaging Query system in accordance with this application.

FIG. 8 depicts an example architecture for a CM (camouflaging messaging) system in message exchanging via a server. Similar to the example in FIG. 2, it includes a database 802, a CM generator 804, a key generator 812, an application interface 808, a CM policy center 810 and a user interface 806. Database 802 stores contents for generating CMs. CM generator 804 consults CM policy center 810 for proper content to generate for the current messaging session.

CM generator 804 can generate CMs by retrieving words from database 802 randomly. Then it generates CM by recombining words into messages that follow grammar rules so that the CMs are understandable to humans. Application Interface 808 interacts with other parts of the client software or applications. The CMs generated in CM generator 804 are sent to Application Interface 808 for transmission. Key generator 812 generates the key identifying the IM that has been collected by the Application Interface 808. Application Interface 808 combines or mixes the IM and CM to send to a server. In one embodiment, Application Interface 808 further sends the key via a different communication link that bypasses the server to the second user. In another embodiment where the key is the result of an encryption of the IM, Application Interface 808 can send the key over the same communication link to the server. The timing and pattern of transmission by the Application Interface 808 is dictated by the CM policy center 810. The User Interface 806 lets user configure the CM policy center 810.

Figure 9:
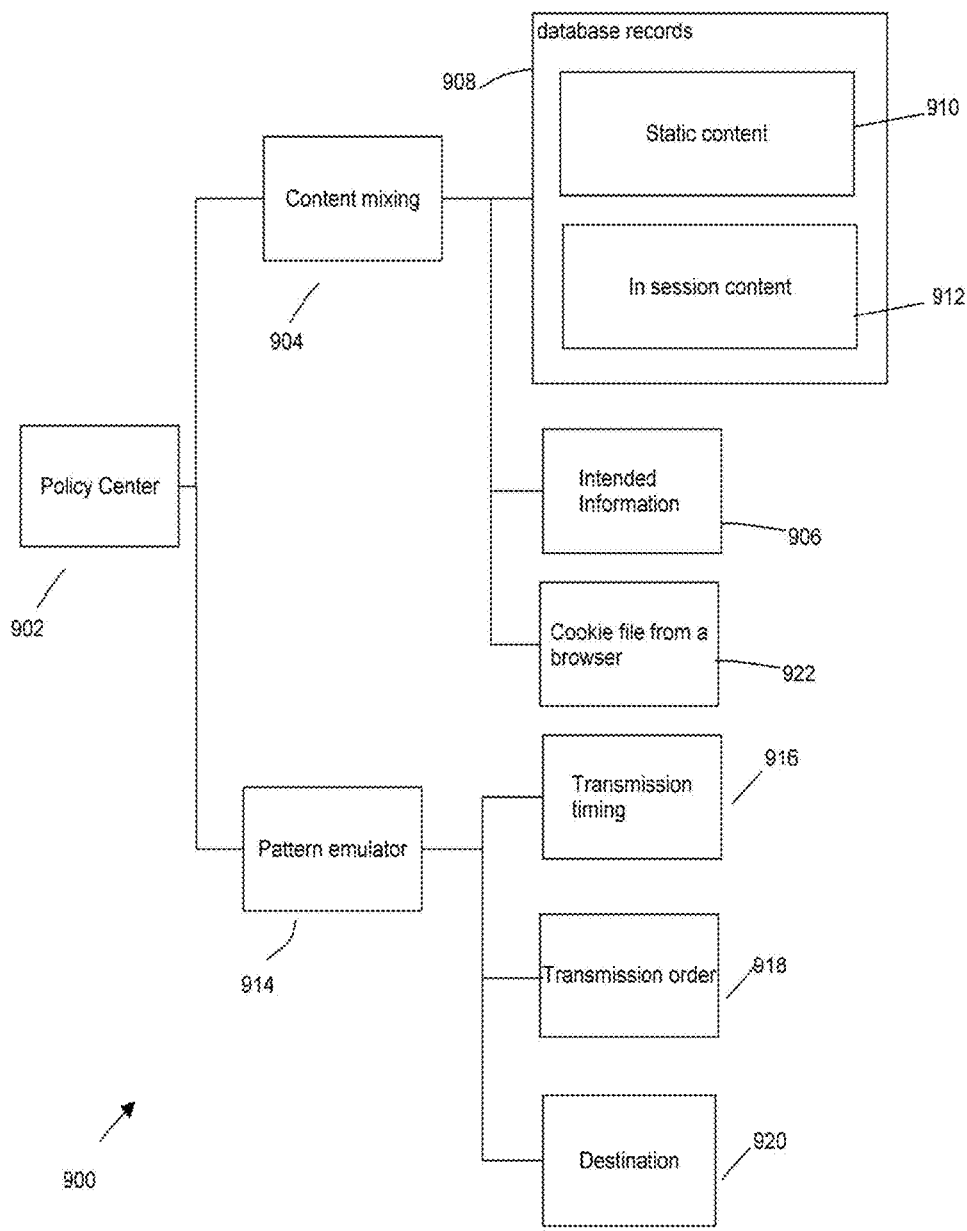
FIG. 9 schematically depicts the structural components of a Policy Center in an example Camouflaging Query system in accordance with this application.

FIG. 9 depicts an example Policy Center component 900. Policy Center 900 can be responsible for emulating the clickstream and searching in the case of web browsing; emulating geo locations in location based service scenario; and emulating messages in messaging service scenario. Policy center 902 may be implemented as a policy file that holds maintaining information and functional instructions for other components of a CQ system.

Policy center 902 contains part 904 for holding policy as to how to mix Content and part 914 for how to emulate patterns. Part 908 further contains part 908 to conceptually represent the database. The content mixing 904 is responsible for the rules of mixing different parts of a camouflage information or query. The database has two primary types of records: static content as in 910, and 'In Session Content' as in 912. The static content is what pre-installed, such as a dictionary of words, and a plurality of websites' URLs, the IP addresses of websites, geo-location information or geographic information system (GIS) information. They can be periodically updated through downloading but generally they are regarded as static when speaking of a specific session. The 'In Session Content' is the records that are generated by selecting the embedded information during an active session of the system. For instance, the URL links embedded in a returned web page is stored in 912. It is important to have the 'In Session Content' represented in the CQs because that emulates a typical web user's clickstream. In addition, the content mixing is responsible for the ratio between the number of entries of the static and in session content; and the ratio between the amount of the intended information 906 and camouflage information, to be sent out. It has to be pointed out that the intended information 906 is not necessarily present or known to the system in all embodiments. If it is not known, the policy center would use a default pre-set guess number to estimate the density of intended information sent during any given time. For instance, when the system is a standalone web browsing emulator, the intended information originated from a user-launched browser is independent of the system and is not present or known by the system. Cookie file from a browser as depicted in 922 is optional based on user configuration. The user is able to choose to allow the system to access a web browser's cookie file by supplying the file path on the user's computer. If a cookie file is supplied, the emulation of a web browser appears to be more genuine, but the policy center has more responsibility not to interfere with a normal browser's activities during or after the system is run. The user is able to add or remove specific camouflage entries such as web sites or search text from the user interface to reduce potential interference. For instance, camouflage queries sent to a search engine such as Google.com has little risk of interference with a web browser even if a cookie from Google.com is supplied, but a banking website that the user has already logged in probably should be taken off from the camouflage queries. Pattern emulator 914 deals with how and when the information is sent out. The Transmission timing 916 tells when is the time a CQ or a CM's should be sent out. For instance, in the web browsing case, the embedded URLs in a returned web page should allow at least several seconds before one of the URL link is sent out to the server. This is to emulate the time a typical human web user needs to read and respond to a returned web page. Transmission order 918 deals with the order of each of the queries or messages to be sent. Destination 920 records the destination of each CQ or CM. It also logs the responses, and characteristics of each destination of a CQ or CM as basis for future better policy of the policy center.

Figure 10:
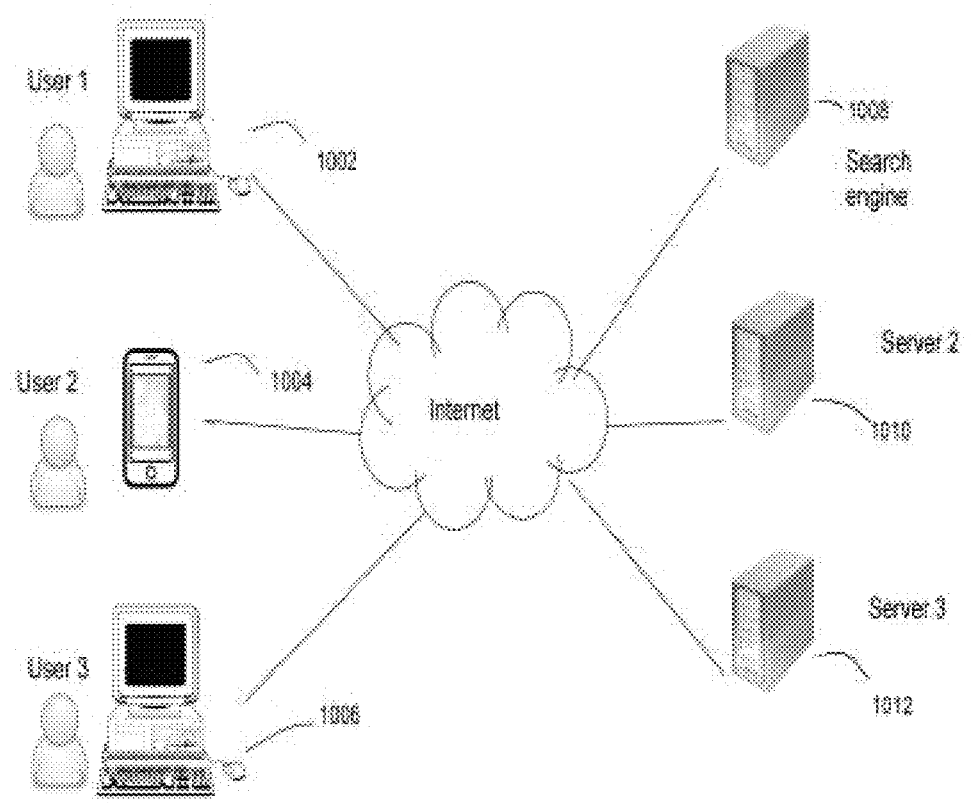
FIG. 10 depicts the computer architecture of the Internet communication for users and servers.

FIG. 10 depicts an architecture of the Internet communication for a CQ system. In a CQ system in a web search or web-browsing scenario, a web browser and a preferred embodiment of the present invention are co-located on 1002 User 1 computer. Server 1008 is a search engine server such as www.google.com, server 1010 is a web server that uses http protocol, or provides geo-location based services, and server 2012 is a server such as twitter.com, SKYPE™, or WECHAT™ (an instant messaging service). The system sends CQs to an Internet servers 1008 and 1010. In a location based service query scenario, the client software that incorporates an embodiment of the present invention is in 1004 user 2's mobile device, and it accesses one of the servers such as 1008 search engine, or 1010 web server 2 via the Internet. In a messaging scenario, 1004 User 2 and 1006 User 3 are messaging each other through 1012 Server 3. The keys identifying the intended messages are passed through 1010 server 2, or a different link not shown in this figure. It should be noted that there are other embodiments of the present invention that may use different architectures.

Figure 11:
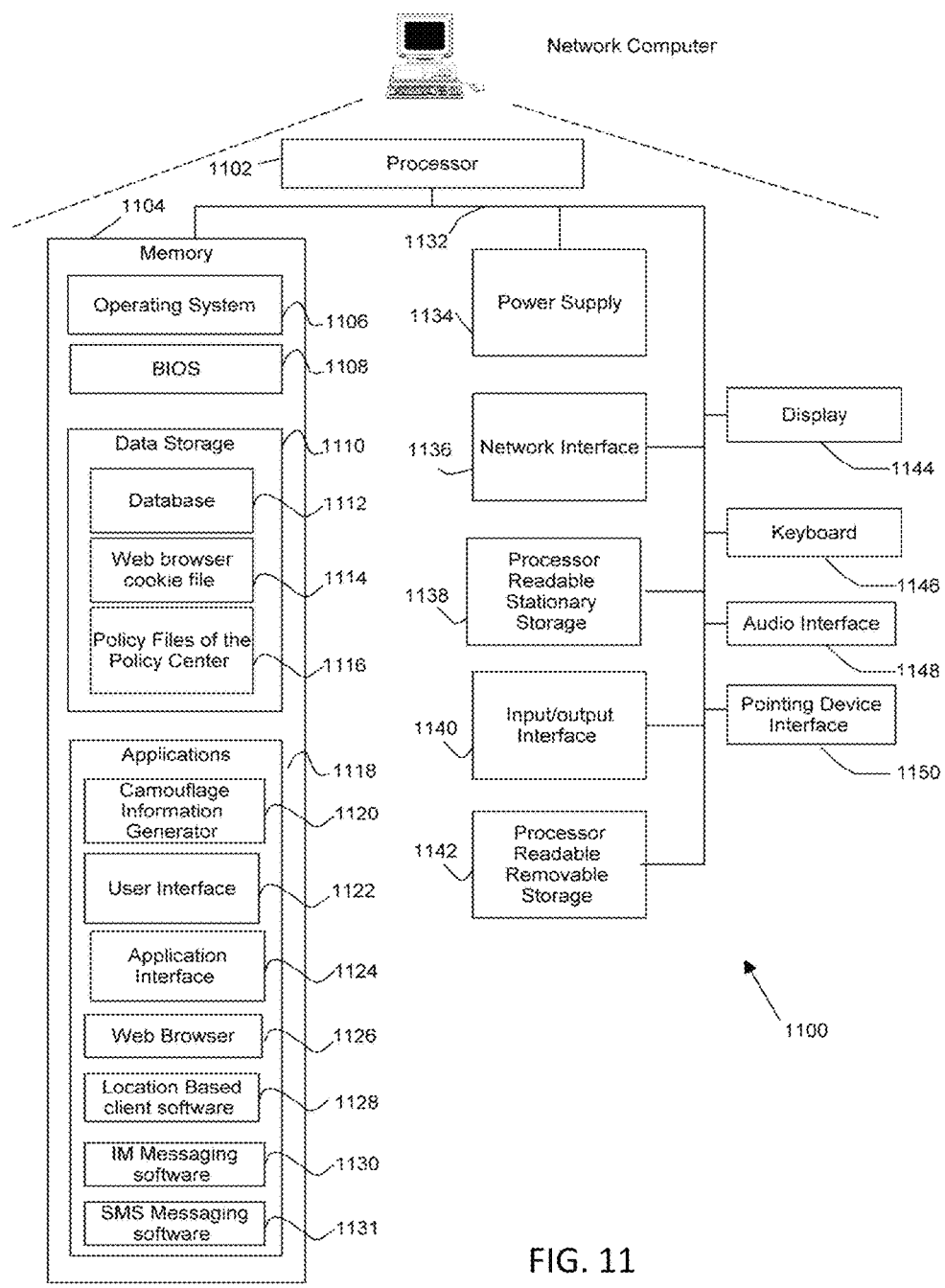
FIG. 11 schematically depicts the network computer apparatus and hardware processors for implementing an embodiment of the present invention.

FIG. 11 shows one embodiment of network computer 1100 that may be included in a system implementing some embodiments of the invention. Network computer 1100 may include many more or less components than those shown in FIG. 11. However, the components shown are sufficient to disclose an illustrative embodiment for practicing these innovations. Network computer 1100 may represent, for example, one embodiment of at least one of network computer 1002, 1004, or 1006 of FIG. 10. As shown in the FIG. 11, network computer 1100 includes a processor 1102 in communication with a memory 1104 via a bus 1132. Network computer 1100 also includes a power supply 1134, network interface 1136, audio interface 1148, display 1144, keyboard 1146, input/output interface 1140, and processor-readable stationary storage device 1138. Power supply 1134 provides power to network computer 1100.

Network interface 1136 includes circuitry for coupling network computer 1100 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Realtime Transport Protocol (SIP/RTP), or any of a variety of other wired and wireless communication protocols. Network interface 1136 is sometimes known as a transceiver, transceiving device, or network interface card (NIC). Network computer 1100 may optionally communicate with a base station (not shown), or directly with another computer.

Display 1144 may be a liquid crystal display (LCD), gas plasma, electronic ink, light emitting diode (LED), Organic LED (OLED) or any other type of light reflective or light transmissive display that can be used with a computer. Display 1144 may be a handheld projector or pico projector capable of projecting an image on a wall or other object. Network computer 1100 may also comprise input/output interface 1140 for communicating with external devices or computers not shown in FIG. 11. Input/output interface 1140 can utilize one or more wired or wireless communication technologies, such as USB™, FIREWIRE™, WIFI™, WIMAX™, THUNDERBOLT™ INFRARED™, BLUETOOTH™, ZIGBEE™, serial port, parallel port, and the like.

Human interface components can be physically separate from network computer 1100, allowing for remote input and/or output to network computer 1100. For example, information routed as described here through human interface components such as display 1144 or keyboard 1146 can instead be routed through the network interface 1136 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 1150 to receive user input.

Memory 1104 may include Random Access Memory (RAM), Read-Only Memory (ROM), and/or other types of memory. Memory 1104 illustrates an example of computer-readable storage media (devices) for storage of information such as computer-readable instructions, data structures, program modules or other data. Memory 1104 stores a basic input/output system (BIOS) 1108 for controlling low-level operation of network computer 1100. The memory also stores an operating system 1106 for controlling the operation of network computer 1100. It will be appreciated that this component may include a general-purpose operating system such as a version of UNIX, or LINUX™, or a specialized operating system such as Microsoft Corporation's WINDOWS™ operating system, or the Apple Corporation's IOS™ operating system. The operating system may include, or interface with a Java virtual machine module that enables control of hardware components and/or operating system operations via Java application programs.

Memory 1104 may further include one or more data storage 1110, which can be utilized by network computer 1100 to store, among other things, applications 1118 and/or other data. For example, data storage 1110 may also be employed to store information that describes various capabilities of network computer 1100. The information may then be provided to another device or computer based on any of a variety of events, including being sent as part of a header during a communication, sent upon request, or the like. Data storage 1110 may also be employed to store social networking information including address books, buddy lists, aliases, user profile information, or the like. Data storage 1110 may further include program code, data, algorithms, and the like, for use by a processor, such as processor 1102 to execute and perform actions such as those actions described in conjunction with FIGS. 1-10. In one embodiment, at least some of data storage 1110 might also be stored on another component of network computer 1100, including, but not limited to, non-transitory media inside processor-readable removable storage device 1142, processor-readable stationary storage device 1138, or any other computer-readable storage device within network computer 1100, or even external to network computer 1100. Data storage 1100 may include, for example, the database 1112, which is also shown as 506 in FIG. 6; 202 in FIG. 2; 802 in FIG. 8; or a policy file 1116 of the policy center, which is also shown as 900 in FIG. 9.

Applications 1118 may include computer executable instructions which, when executed by network computer 1100, transmit, receive, and/or otherwise process messages (e.g., SMS, Multimedia Messaging Service (MMS), Instant Message (IM), email, and/or other messages), audio, video, and enable telecommunication with another user of another computer over a computer network such as the Internet in FIG. 10. Other examples of application programs include web browser 1126 which is shown as 110 in FIG. 1, Camouflage Information generator 1120 which could be a camouflage query generator as shown in 202 in FIG. 2, or a camouflage message generator also shown in 804 in FIG. 8, User interface 1122, Application Interface 1124, email client applications, location based service applications, IM applications 1130, SMS applications 1131, Voice Over Internet Protocol (VOIP) applications, contact managers, task managers, transcoders, database programs, word processing programs, security applications, spreadsheet programs, games, search programs, and so forth. Applications 1118 may include camouflage information generator which may be enabled to perform actions further described below in conjunction with FIGS. 1-10. In at least one of the various embodiments, camouflage information generator 1120, the User Interface 1122 and the Application interface 1124 may be implemented as modules and/or components of the same application. Further, in at least one of the various embodiments, Camouflage Information generator 1120 may be implemented as extensions, toolbar, modules, plugins, or the like of another software application such as a web browser 1126, a Location Based Client Software 1128, or a messaging software application 1130.

Figure 12A:
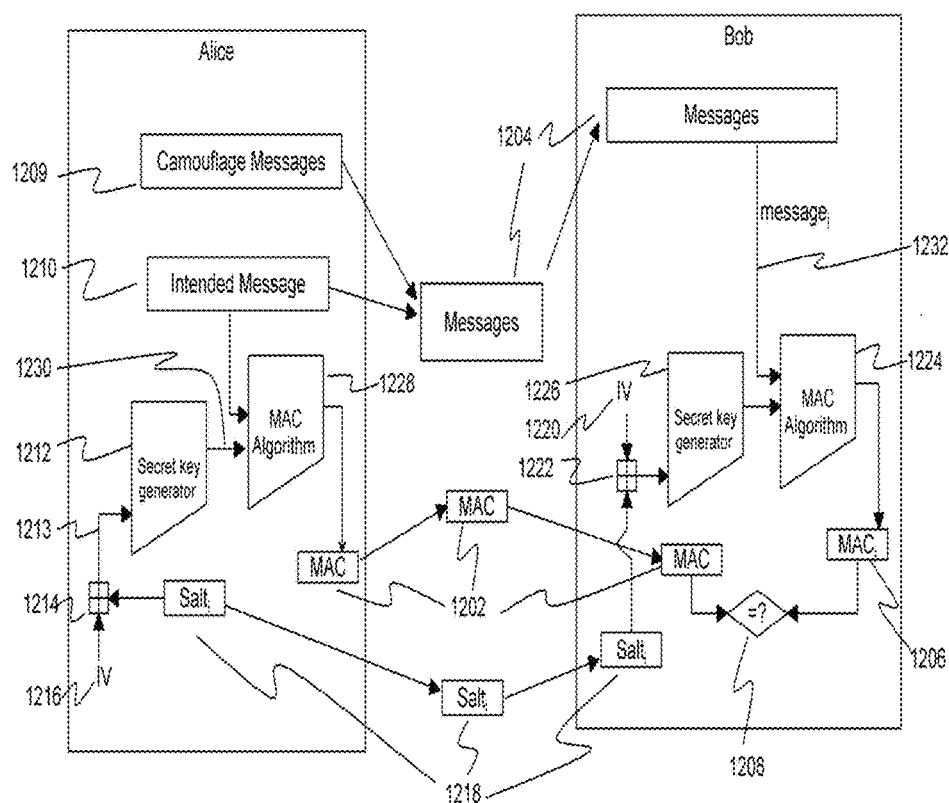
FIG. 12A schematically depicts an example use of MAC algorithm for hybrid IM/CMs in an example Camouflaging Query system in accordance with this application.
Figure 12B:
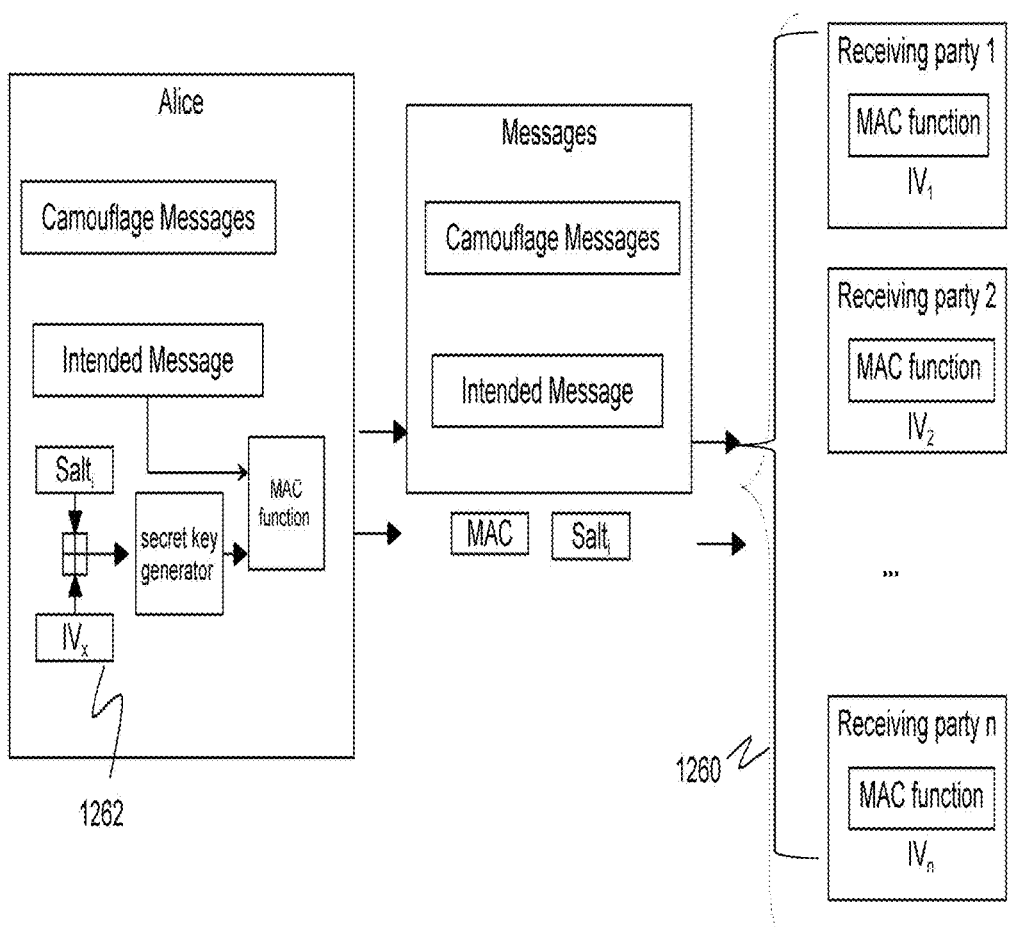
FIG. 12B schematically depicts an example use of MAC algorithm for hybrid IM/CMs in an example Camouflaging Query system in broadcasting to a group of receiving parties in an example Camouflaging Query system in accordance with this application.

FIG. 12A and FIG. 12B depict system components for messaging using an IM/CMs system with MAC algorithm. First a random number Salt 1218 is generated, and is concatenated in 1214 with the Initial Value (IV) 1216 to generate a string. The string is fed into a secret key generator 1212, which is typically a cryptographic hash function such as SHA-1 hash function. The outcome of 1212 is a 160-bit hash value and is used as the secret key for generating the MAC code 1202 of the intended message 1210, in the MAC algorithm 1228. The MAC algorithm could be an HMAC function, or other MAC functions. The camouflage messages 1209 and the intended messages are sent to Bob as Messages 1204, also shown as 602 and 606 in FIG. 6. The MAC 1202 and Salt 1218 are also sent to Bob; in one embodiment the MAC and Salt are send in 602 and 606 in FIG. 6; while in another embodiment, they are sent in 610 in FIG. 6. On Bob's side, Bob's IV 1220 is first concatenated with Salt$_i$ 1218 in 1222, and then fed into the same SHA-1 hash function 1226. The outcome is used as the secret key, along with message$_j$ 1232, for the same MAC algorithm 1224 as used by Alice. For each message$_j$ 1232, there is MAC$_j$ 1206 produced. Comparing each such MAC$_j$ with the MAC 1202 received in step 1208, until a match is found. The corresponding message is the intended message. The IV 1216 and IV 1220 are kept by Alice and Bob as secret. Without the same IV, other parties practicably cannot recover the intended message.

FIG. 12B depicts that Alice is able to broadcast to a group of receiving parties and have control over who may get the intended message. Alice has an array of IV. She chooses to use an IV$_x$, which matches the IV possessed by the intended recipients. The Messages, MAC and the Salt are broadcast in 1260 to all the receiving parties. Only the recipient with the matching IV is able to recover the intended message. In one broadcast, there are a plurality of intended messages and camouflage messages. The receiving parties each receives all of them plus a group of salt and MAC values, either though the same communication link as the IM/CM or through a different channel. Each MAC value is the result of a MAC operation on one intended message. Each receiving party uses his or her own IV and the salt to generate the secret key for the MAC function. Iterating MAC operation on all received messages may reveal the intended message if the IV matches the IV Alice used for that intended message.

It will be apparent to those skilled in the art having the benefit of this disclosure that the present invention contemplates methods, systems, and media for using camouflage information to mask the identity of user generated information, hence enhancing communication privacy. It is understood that the form of the invention shown and described in the detailed description and the drawings are to be taken merely as examples. It is intended that the following claims be interpreted broadly to embrace all the variations of the example embodiments disclosed.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A computer device for protecting user data privacy in a Query-Response modeled network system having a Query Unit that communicates with a Response Unit, comprising:
   a plurality of computer processors being instructed to execute and run a set of computer software functional components, wherein said set of computer software functional components further comprise:
   a user Intended Query being sent from said Query Unit to said Response Unit; and
   a Camouflage Query generator for automatically generating a plurality of Camouflage Queries (CQs), the Camouflage Queries being sent to said Response Unit or a different Response Unit,
   wherein said plurality of Camouflage Queries are selected from a group of queries consisting of string, computer software code, computer executable instructions, geo-location coordinates, audio signals, video signals, electronic signals, and electromagnetic signals.

2. The computer device for protecting user data privacy of claim 1, wherein said set of computer software functional components further comprise:
   a database storing with a plurality of query entries wherein said Camouflage Query generator generates Camouflage Queries using said database.

3. The computer device for protecting user data privacy of claim 2, wherein said set of computer software functional components further comprise:
   a policy center having at least one policy rule, wherein said Camouflage Query generator generates CQs in accordance with said policy rule; and
   a graphic user interface for accepting user input by a user to specify said policy rule.

4. The computer device for protecting user data privacy of claim 1, wherein said Query Unit is an independent web browser and said user Intended Query being sent by said independent web browser.

5. The computer device for protecting user data privacy of claim 1, wherein said set of computer software functional components further comprise:
   a user application component wherein said user application component is configured to send both said user Intended Query and said Camouflage Queries.

6. The computer device for protecting user data privacy of claim 5, wherein said user application component and said Query Unit are respectively a mobile app for being installed on a mobile device.

7. The computer system for protecting user data privacy of claim 6, wherein said user Intended Query includes a user geo-ordinate information from a sensor; and said Camouflage Queries contain computer automatically generated false-geo-ordinate information.

8. The computer device for protecting user data privacy of claim 5, wherein said user application component is a toolbar of web browser's or plug-in application to a third party web browse.

9. The computer system for protecting user data privacy of claim 1, wherein said Camouflage Query generator is co-located with a GPS sensor device and generates Camouflage Queries containing computer generated false-geo-ordinate information.

10. The computer device for protecting user data privacy of claim 1, wherein said Query Unit and said Response Unit in a messaging system for sending and receiving messages using a UDP protocol; and a user Intended Query is a message; and said Camouflage Query generator generates Camouflage Queries in a human understandable message form.

11. The computer device for protecting user data privacy of claim 10, wherein said Camouflage Query generator generates a mixed message by combining said user Intended Query with said plurality of Camouflage Queries and then send said mixed message to said Response Unit.

12. A computer intallable device for protecting user data privacy in a Query-Response modeled network system having a Query Unit that communicates with a Response Unit, comprising:
   a computer storage hard disk containing a set of computer installable excutable instructions and a set of computer software functional components to be instablled on a computer, said set of computer software functional components further comprise:
   a Camouflage Query generator for automatically generating a plurality of Camouflage Queries (CQs), the Camouflage Queries for being sent to said Response Unit or a different Response Unit,
   wherein said plurality of Camouflage Queries are selected from a group of queries consisting of string, computer software code, computer executable instructions, geo-location coordinates, audio signals, video signals, electronic signals, and electromagnetic signals.

13. The computer intallable device for protecting user data privacy of claim 11, wherein said set of computer software functional components further comprise a database a database storing with a plurality of query entries wherein said Camouflage Query generator generates Camouflage Queries using said database.

14. The computer intallable device for protecting user data privacy of claim 13, wherein said set of computer software functional components further comprise a policy center having at least one policy rule, wherein said Camouflage Query generator generates CQs in accordance with said policy rule; and a graphic user interface for accepting user input by a user to specify said policy rule.

15. A method for protecting user data privacy, said method comprising the steps of:
   sending a user Intended Query from a Query Unit to a Response Unit;
   automatically generating a plurality of Camouflage Queries by a computer component in sufficient number ratio to said Intended Query to create sufficient noise; and
   sending said plurality of Camouflage Queries to said Response Unit,
   wherein said plurality of Camouflage Queries are selected from a group of queries consisting of string, computer software code, computer executable instructions, geo-location coordinates, audio signals, video signals, electronic signals, and electromagnetic signals.

16. The method of claim 15, wherein the step of sending a user Intended Query and the step of sending said plurality of Camouflage Queries are respectively by TCP/IP-based protocols.

17. The method of claim 15, wherein said step of automatically generating a plurality of Camouflage Queries is by using a database and a Camouflage Query generator that automatically retrieves words and query content from said database to form a Camouflage Query.

18. The method of claim 15, wherein said step of automatically generating a plurality of Camouflage Queries further comprise a step of providing a policy center having a plurality of policy rules, and said Camouflage Query generator generates said plurality of Camouflage Queries in accordance with said plurality of policy rules.

19. The method of claim 15, where said Intended Query is generated by a Query Unit using signals from a GPS sensor, and said plurality of Camouflage Queries contain geo-information randomly generated from a database.

* * * * *